United States Patent
Atkins et al.

(10) Patent No.: US 7,644,356 B2
(45) Date of Patent: Jan. 5, 2010

(54) CONSTRAINT-BASED ALBUMING OF GRAPHIC ELEMENTS

(75) Inventors: C. Brian Atkins, Mountain View, CA (US); Xiaofan Lin, Sunnyvale, CA (US); Mihaela Irina Enachescu, Stanford, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 588 days.

(21) Appl. No.: 11/151,167

(22) Filed: Jun. 10, 2005

(65) Prior Publication Data

US 2006/0279566 A1 Dec. 14, 2006

(51) Int. Cl.
*G06F 17/00* (2006.01)
(52) U.S. Cl. ...................................... 715/243
(58) Field of Classification Search ................ 715/200, 715/243, 764
See application file for complete search history.

(56) References Cited

U.S. PATENT DOCUMENTS

| | | | |
|---|---|---|---|
| 5,136,686 A | 8/1992 | Koza | |
| 5,499,366 A | 3/1996 | Rosenberg et al. | |
| 5,555,362 A | 9/1996 | Yamashita et al. | |
| 5,634,133 A * | 5/1997 | Kelley | 715/209 |
| 5,649,216 A * | 7/1997 | Sieber | 715/234 |
| 5,712,995 A | 1/1998 | Cohn | |
| 5,729,254 A | 3/1998 | Marks et al. | |
| 5,760,786 A | 6/1998 | Marks et al. | |
| 5,920,315 A | 7/1999 | Santos-Gomez | |
| 5,956,738 A | 9/1999 | Shirakawa | |
| 6,005,560 A | 12/1999 | Gill et al. | |
| 6,008,809 A | 12/1999 | Brooks | |
| 6,052,516 A * | 4/2000 | Tajima | 716/7 |
| 6,081,262 A | 6/2000 | Gill et al. | |
| 6,081,816 A * | 6/2000 | Agrawal | 715/210 |
| 6,088,708 A | 7/2000 | Burch et al. | |
| 6,111,586 A | 8/2000 | Ikeda et al. | |
| 6,121,970 A | 9/2000 | Guedalia | |
| 6,144,974 A | 11/2000 | Gartland | |
| 6,288,719 B1 * | 9/2001 | Squilla et al. | 715/805 |
| 6,301,586 B1 | 10/2001 | Yang et al. | |
| 6,380,954 B1 | 4/2002 | Gunther | |
| 6,385,758 B1 * | 5/2002 | Kikuchi et al. | 716/2 |
| 6,415,306 B2 | 7/2002 | Seaman | |

(Continued)

FOREIGN PATENT DOCUMENTS

EP 1186992 A2 3/2002

(Continued)

OTHER PUBLICATIONS

Kustanowitz et al., Meaningful Presenations of Photo Libraries: Rationale and Applications of Bi-Level Radial Quantum Layouts, ACM 2005, pp. 188-196.*

(Continued)

*Primary Examiner*—Cong-Lac Huynh

(57) ABSTRACT

Methods, machines, systems and machine-readable instructions for albuming graphic elements are described. In one aspect, candidate relative layouts of graphic elements on a page are identified. Each of the candidate relative layouts describes a respective set of layout relationships among the graphic elements. A respective set of constraints describing the corresponding set of layout relationships among the graphic elements is generated for each of the candidate relative layouts. A respective determinate layout of the graphic elements on the page is determined from each set of constraints. One of the determinate layouts is selected as a final layout of the graphic elements on the page.

29 Claims, 15 Drawing Sheets

U.S. PATENT DOCUMENTS

| | | | |
|---|---|---|---|
| 6,448,956 B1 | 9/2002 | Berman et al. | |
| 6,563,602 B1 | 5/2003 | Uratani et al. | |
| 6,596,032 B2 * | 7/2003 | Nojima et al. | 715/247 |
| 6,620,206 B1 * | 9/2003 | Seaman et al. | 715/232 |
| 6,636,648 B2 | 10/2003 | Loui et al. | |
| 6,636,650 B1 | 10/2003 | Long et al. | |
| 6,697,999 B1 | 2/2004 | Breuer et al. | |
| 6,701,306 B1 | 3/2004 | Kronmiller et al. | |
| 6,727,909 B1 | 4/2004 | Matsumura et al. | |
| 6,771,292 B2 | 8/2004 | Sharp | |
| 6,771,801 B1 | 8/2004 | Fisher et al. | |
| 6,977,665 B2 | 12/2005 | Yokouchi | |
| 7,013,432 B2 | 3/2006 | Taylor et al. | |
| 7,019,864 B2 | 3/2006 | Delhoune et al. | |
| 7,093,263 B1 | 8/2006 | Sexton et al. | |
| 7,096,445 B1 | 8/2006 | Pucci et al. | |
| 7,124,360 B1 | 10/2006 | Drenttel et al. | |
| 7,145,674 B2 | 12/2006 | Hayes | |
| 7,148,990 B2 | 12/2006 | Atkins et al. | |
| 7,149,968 B1 | 12/2006 | Ackerschewski et al. | |
| 7,184,167 B1 | 2/2007 | Ito et al. | |
| 7,207,735 B2 | 4/2007 | Narusawa et al. | |
| 7,275,210 B2 | 9/2007 | Girgensohn | |
| 7,281,199 B1 | 10/2007 | Nicol et al. | |
| 7,340,676 B2 | 3/2008 | Geigel et al. | |
| 7,478,328 B2 * | 1/2009 | Hannebauer et al. | 715/731 |
| 2001/0033296 A1 | 10/2001 | Fullerton et al. | |
| 2002/0051208 A1 | 5/2002 | Venable | |
| 2002/0059322 A1 | 5/2002 | Miyazaki et al. | |
| 2002/0070982 A1 | 6/2002 | Hill et al. | |
| 2002/0095439 A1 * | 7/2002 | Long et al. | 707/507 |
| 2002/0122067 A1 | 9/2002 | Geigel et al. | |
| 2002/0145603 A1 | 10/2002 | Iwasaki | |
| 2003/0001879 A1 | 1/2003 | Lin et al. | |
| 2003/0033581 A1 * | 2/2003 | Mukai | 716/2 |
| 2003/0072486 A1 * | 4/2003 | Loui et al. | 382/175 |
| 2004/0019850 A1 | 1/2004 | Purvis et al. | |
| 2004/0019851 A1 | 1/2004 | Purvis et al. | |
| 2004/0019852 A1 | 1/2004 | Purvis | |
| 2004/0054668 A1 | 3/2004 | Watanabe et al. | |
| 2004/0128264 A1 | 7/2004 | Watanabe et al. | |
| 2004/0139398 A1 * | 7/2004 | Testa et al. | 715/517 |
| 2004/0187078 A1 | 9/2004 | Girgensohn | |
| 2004/0205472 A1 | 10/2004 | Purvis | |
| 2004/0225961 A1 * | 11/2004 | Ohashi et al. | 715/517 |
| 2005/0071743 A1 * | 3/2005 | Harrington et al. | 715/500 |
| 2005/0071781 A1 | 3/2005 | Atkins | |
| 2005/0071783 A1 | 3/2005 | Atkins | |
| 2005/0094207 A1 | 5/2005 | Lo et al. | |
| 2005/0132283 A1 * | 6/2005 | Diwan et al. | 715/517 |
| 2005/0138570 A1 | 6/2005 | Good et al. | |
| 2005/0154980 A1 * | 7/2005 | Purvis et al. | 715/513 |
| 2005/0223319 A1 * | 10/2005 | Ohashi et al. | 715/517 |
| 2005/0240865 A1 | 10/2005 | Atkins et al. | |
| 2006/0066631 A1 * | 3/2006 | Schorr et al. | 345/619 |
| 2006/0082820 A1 * | 4/2006 | Anderson et al. | 358/1.15 |
| 2006/0100366 A1 | 5/2006 | Amit et al. | |
| 2006/0150091 A1 * | 7/2006 | Suzuki et al. | 715/517 |
| 2006/0195784 A1 * | 8/2006 | Koivisto et al. | 715/523 |
| 2006/0200758 A1 | 9/2006 | Atkins | |
| 2006/0242567 A1 * | 10/2006 | Rowson et al. | 715/517 |
| 2006/0259857 A1 * | 11/2006 | Atkins | 715/517 |
| 2006/0279566 A1 | 12/2006 | Atkins | |
| 2007/0079236 A1 * | 4/2007 | Schrier et al. | 715/517 |
| 2007/0118797 A1 * | 5/2007 | Layzell | 715/517 |
| 2008/0022197 A1 * | 1/2008 | Bargeron et al. | 715/246 |
| 2008/0094420 A1 | 4/2008 | Geigel et al. | |
| 2008/0136822 A1 * | 6/2008 | Schorr et al. | 345/441 |
| 2008/0148196 A1 * | 6/2008 | Su et al. | 716/2 |
| 2008/0244499 A1 * | 10/2008 | Hanamitsu | 716/15 |
| 2008/0313533 A1 | 12/2008 | Hoyer et al. | |
| 2009/0024914 A1 * | 1/2009 | Chen et al. | 715/230 |

FOREIGN PATENT DOCUMENTS

| | | |
|---|---|---|
| EP | 1503336 A2 | 2/2005 |
| GB | 2378340 A | 2/2003 |
| JP | 01-191270 | 1/1989 |
| JP | 09-185728 | 7/1997 |
| JP | 10-293838 | 11/1998 |
| JP | 2002-288669 | 4/2002 |
| JP | 2002-142092 | 5/2002 |
| JP | 2003-101749 | 4/2003 |
| JP | 2003-274139 | 9/2003 |
| WO | WO 98/10356 A2 | 3/1998 |
| WO | WO 01/39019 A2 | 5/2001 |
| WO | WO02/37939 A2 | 5/2002 |
| WO | 02/084582 | 10/2002 |
| WO | WO 02/084582 | 10/2002 |

OTHER PUBLICATIONS

Kustanowitz et al., Meaningful Presentations of Photo Libraries: Rationale and Applications of Bi-Level Radial Quantum Layouts, ACM Jun. 2005, pp. 188-196.*

Diakopoulos et al., Mediating Photo Collage Authoring, ACM 2005, pp. 183-186.*

Masui, Graphic Object Layout with Interactive Genetic Algorithms, IEEE 1992, pp. 1-7.*

Lok et al., A Survey of Automated Layout Techniques for Information Presentations, Google 2001, pp. 1-8.*

Joe Geigel et al., "Automatic page layout using genetic algorithms for electronic albuming,"Proceedings of Electronic Imaging 2001 (Jan. 2001) available on-line at http://www.

Eldan Goldenberg, "Automatic layout of variable-content print data," MCs Dissertation, School of Cognitive & Computing Sciences, University of Sussex, Brighton, UK (2002).

D.F. Wong et al., "A new algorithm for floorplan design," Proc. Design Automation Conference, pp. 101-107, 1986.

Joe Geigel et al., "Automatic page layout using genetic algorithms for electronic albuming,"Proceedings of Electronic Imaging 2001 (Jan. 2001).

D.F. Wong et al., "A new algorithm for floorplan design," Proc. Design Automation Conference, pp. 101-107, 1986.

C Brian Atkins - "Adaptive Photo Collection Page Layout" - HP Labs - Palo Alto CA -2004 International Conference - Oct. 24, 2004.

Joe Geigel - "Automatic Page Layout Using Genetic Algorithms for Electronic Albuming"-Electronic Imaging 2001 - Jan. 21-26, 2001.

Andreas Girgensohn et al. - "Stained Class Photo Collages" - UIST'04 - Oct. 24-27, 2004.

C Brian Atkins - "Blocked Recursive Image Composition" - MM '08 - Oct. 26-31, 2008.

Carsten Rother et al - "AutoCollage" - ACM Transactions on Graphics (TOG) vol. 25, issue 3 (Jul. 2000).

* cited by examiner

CONSTRAINT-BASED ALBUMING OF GRAPHIC ELEMENTS

CROSS-REFERENCE TO RELATED APPLICATIONS

This application relates to the following co-pending applications, each of which is incorporated herein by reference: U.S. patent application Ser. No. 10/675,724, filed Sep. 30, 2004, by C. Brian Atkins and entitled "Automatic Photo Album Layout"; U.S. patent application Ser. No. 10/675,823, filed Sep. 30, 2004, by C. Brian Atkins and entitled "Single Pass Automatic Photo Album Layout"; U.S. patent application Ser. No. 11/127,326, filed May 12, 2005, by C. Brian Atkins and entitled "Method for Arranging Graphic Assemblies"; and U.S. patent application Ser. No. 11/107,175, filed Apr. 15, 2005, by Xiaofan Lin et al. and entitled "Automatic Layout Generation for Documents Containing Text".

BACKGROUND

Individuals and organizations are rapidly accumulating large collections of digital image content, including still images, text, graphics, animated graphics, and full-motion video images. This content may be presented individually or combined in a wide variety of different forms, including documents, catalogs, presentations, still photographs, commercial videos, home movies, and meta data describing one or more associated digital content files. As these collections grow in number and diversity, individuals and organizations increasingly will require systems and methods for organizing and presenting the digital content in their collections. To meet this need, a variety of different systems and methods for organizing and presenting digital image content have been proposed.

For example, there are several manual digital image albuming systems that enable users to create digital photo albums manually. These systems typically provide tools for organizing a collection of images and laying out these images on one or more pages. Among the common types of tools for manually creating a digital photo album are tools for selecting a subset of images in the collection that will appear on a page of an album, a graphical user interface for manually rearranging the images on the page, and basic image editing tools for modifying various characteristics, such as size and orientation, of the images that will appear in the album. Users typically find the process of generating a digital photo album using fully manual digital image albuming systems to be tedious and time consuming.

Other digital image albuming systems provide various levels of automated image layout functionality. Many of these systems, however, tend to provide a user with too little interactive control over the final layout of images on an album page. For example, some systems only allow a user to change a set of layout parameters that are used to generate the layouts of images on the album pages. Other systems provide some interactive control over the final layout of the images, but respond to user commands in unpredictable or unintuitive ways. Some automated image albuming systems merely provide a user with a set of manual interactive controls that the user may use to alter an automatically-generated album page layout.

Some automated digital image albuming systems allow users to organize digital images into album pages in accordance with dates and times specified in the metadata associated with the images. These systems also typically allow users to annotate the images appearing in the digital photo album pages. Some automated digital image albuming systems provide various predefined layout templates that a user may select to create a digital photo album. In these systems, the user assigns images from the collection to various predefined image locations on a selected layout template, and the system automatically adjusts the size, placement, rotation, and framing of the images in accordance with parameters specified for the various predefined image locations on the selected template.

What is needed is an albuming system that can generate layouts containing different types of graphic elements (e.g., images and text, such as captions) without using predefined templates. Such an albuming system should be able to flexibly determine the relative sizes of image-based graphic elements and line breaks for textual graphic elements in a page layout based on both local and global aspects of the page layout.

SUMMARY

In one aspect, the invention features a machine-implemented method of albuming graphic elements. In accordance with this inventive method, candidate relative layouts of graphic elements on a page are identified. Each of the candidate relative layouts describes a respective set of layout relationships among the graphic elements. A respective set of constraints describing the corresponding set of layout relationships among the graphic elements is generated for each of the candidate relative layouts. A respective determinate layout of the graphic elements on the page is determined from each set of constraints. One of the determinate layouts is selected as a final layout of the graphic elements on the page.

The invention also features a machine, a system and machine-readable instructions for implementing the above-described graphic element albuming method.

Other features and advantages of the invention will become apparent from the following description, including the drawings and the claims.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

I. INTRODUCTION

The embodiments that are described in detail below provide ways to arrange graphic elements on the pages of an album based on constraints describing layout relationships among graphic elements on an album page. These embodiments can create layouts of different types of graphic elements on an album page to be created without using predefined templates, enabling the creation of new types of documents (e.g., photo/video albums with captions). In some implementations, the relative sizes of image-based graphic elements and line breaks for textual graphic elements in a page layout are selected based on both local and global aspects of the page layout. In this way, the lengths of textual graphic elements and the sizes of image-based graphic elements are not restricted by predefined template areas. These embodiments also enable graphic elements that are designated as being related to be kept together in page layouts, thereby preserving the context created by the physical proximity of such graphic elements.

As used herein, the term "album" refers to any type of document that contains graphic elements (e.g., images and text), including traditional photo albums and catalogs in which an image of an item for sale is accompanied by a textual description of the item). The term "albuming" refers to a process of organizing graphical elements (e.g., images and text objects) and laying out graphical elements on a page. The term "page" refers to any type of discrete area in which images may be laid out, including a physical page embodied by a discrete physical medium (e.g., a piece of paper) on which a layout of images may be printed, and a virtual, digital or electronic page containing a layout of images that may be presented to a user by, for example, an electronic display device. The term "album" refers to a discrete collection of pages. The term "album page" refers to a page of an album.

Figure 1:
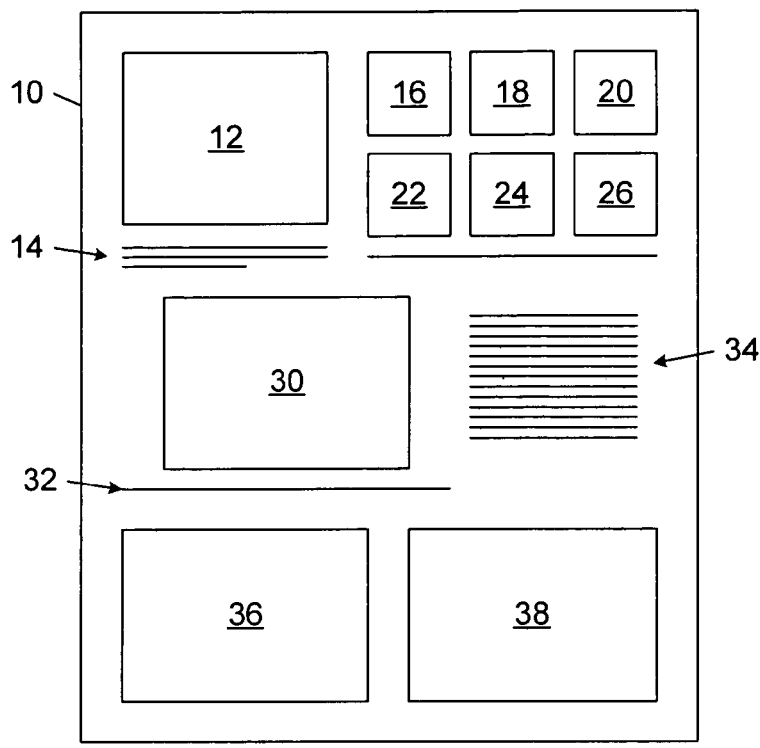
FIG. 1 is a diagrammatic view of a layout of graphic elements on a page.

FIG. 1 shows an exemplary album page 10 that includes multiple graphic elements 12-38. As used herein, the term "graphic element" refers broadly to any type of visually perceptible content that may be rendered on a physical or virtual page of an album, including images and text. Image-based graphic elements (or simply "images") may be complete or partial versions of any type of digital or electronic image, including: an image that was captured by an image sensor (e.g., a video camera, a still image camera, or an optical scanner) or a processed (e.g., filtered, reformatted, enhanced or otherwise modified) version of such an image; a computer-generated bitmap or vector graphic image; a textual image; and an iconographic image. Text-based graphic elements (or simply "text") may consist of a single character or a string of characters.

In some implementations, image-based graphic elements may be designated as fixed-area images or variable-area images. In these implementations, the areas or sizes of the fixed area images are not changed in the generated layouts, whereas the sizes of the variable-area images are permitted to change.

In the illustrated embodiments, each of the image-based graphic elements is assigned a respective aspect ratio. The aspect ratio is defined as the ratio of image height to image width.

Each variable-area image is further assigned a respective positive scalar-valued relative area proportion (RAP). The relative area proportion assigned to a given image j is defined as the area $A_j$ of the rendered version of the given image j relative to the areas of the rendered versions of the other images appearing on the same page. Thus, for any two images j and k on the same page, the ratio of the relative area proportions RAP(j) and RAP(k) equals the ratio of rendered areas $A_j$ and $A_k$:

$$\frac{A_j}{A_k} = \frac{RAP(j)}{RAP(k)} \qquad (1)$$

In some embodiments, the user is allowed to set the relative area proportion values that are assigned to the images. In other embodiments, the albuming system automatically assigns the relative area proportion values to the images.

Figure 2:
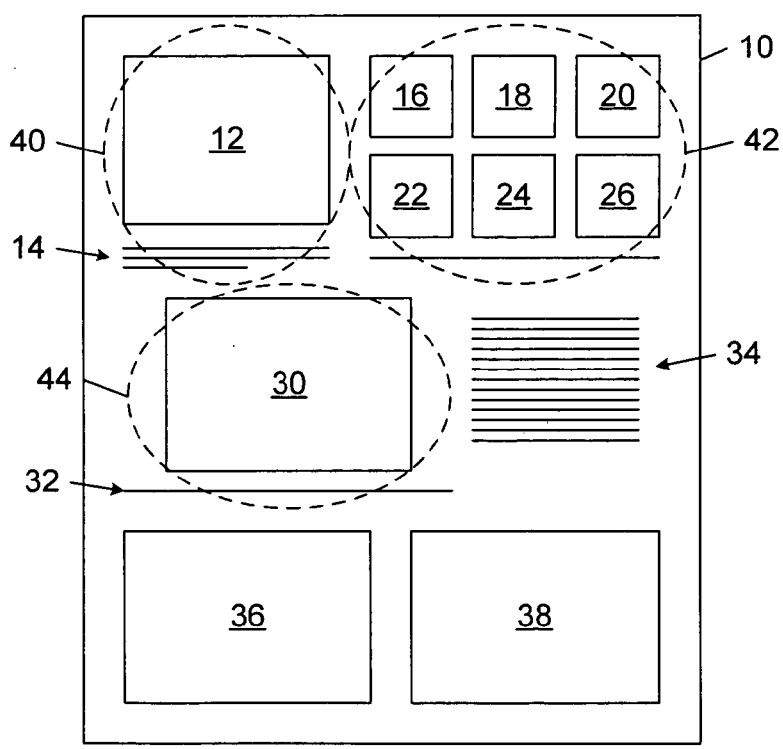
FIG. 2 is a diagrammatic view of the graphic element layout shown in FIG. 1 in which graphic assemblies that are formed from constituent ones of the graphic elements are identified by dashed lines.

As shown in FIG. 2, selected ones of the graphic elements 12-38 may be grouped into graphic assemblies 40, 42, 44 whose constituent graphic elements are intended to appear near one another in a layout of the graphic elements on an album page. As used herein, a "graphic assembly" is a cohesive group or collection of one or more graphic elements. The assignment of graphic elements to a particular graphic assembly signifies that the constituent graphic elements are related. In general, the type of graphic elements in a graphic assembly may be the same or different. In the example shown in FIG. 2, each of the graphic assemblies 40-44 includes different types of graphic elements (i.e., image-based graphic elements represented by boxes and textual graphic elements represented by lines). In addition, the graphic elements of a graphic assembly may be arranged arbitrarily or in a specific ordered sequence (e.g., a temporally ordered sequence of keyframes of a video clip). A graphic element that does not have a cohesive relationship with any other graphic element is a "degenerate" graphic assembly having only one presentation.

Figure 3A:
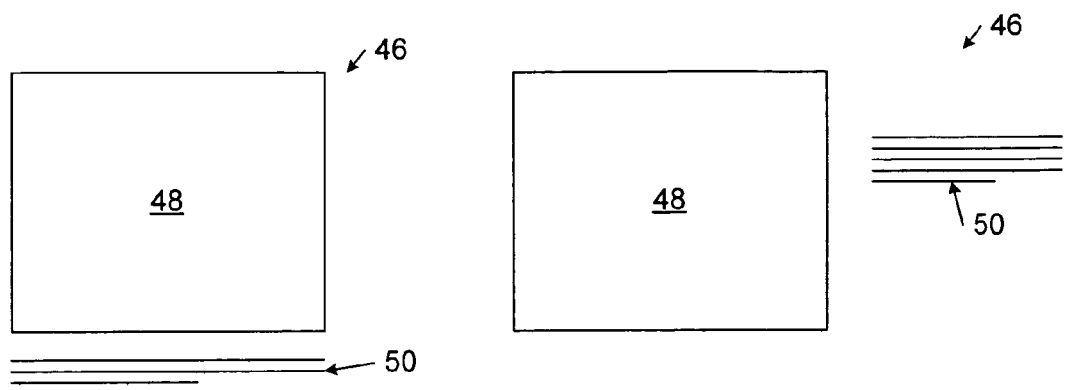
FIG. 3A is a diagrammatic view of two presentations of a graphic assembly of two graphic elements.
Figure 3B:
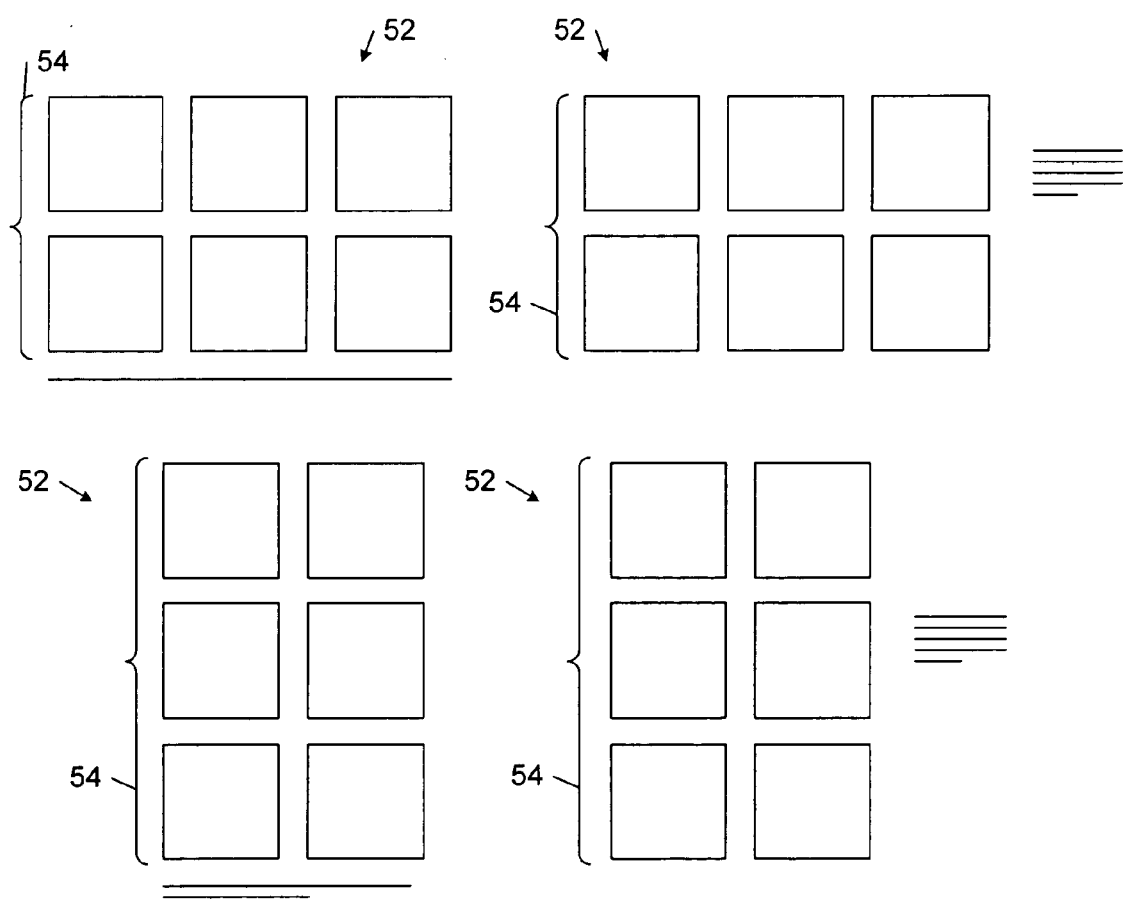
FIG. 3B is a diagrammatic view of four presentations of a graphic assembly of six graphic elements.

Referring to FIGS. 3A and 3B, a graphic assembly having more than one constituent graphic element may be presented (or arranged) in more than one way. In some implementations, the presentations of graphic elements in a graphic assembly are limited to horizontal and vertical arrangements of the graphic elements. In some of these implementations, the presentations may be further limited to certain preferred horizontal and vertical arrangements of the is graphic elements. For example, one implementation only permits presentations in which textual graphic elements appear only to the right of or below the images in the same graphic assembly. In this case, a graphic assembly 46 that includes an image 48 and a text block 50 may be presented in the two different ways shown in FIG. 3A, whereas a graphic assembly 52 that includes a sequence 54 of six video keyframes may be presented in the four different ways shown in FIG. 3B.

In general, graphic assemblies may be laid out on an album page in accordance with a "strict area" style or a "brick" style. In a strict area style layout, the relative areas of graphic assemblies on the same page may meet pre-specified proportions. For example, a user may specify that all graphic assemblies on the same page have the same area. In a brick style layout, the relative areas of graphic assemblies on the same page are selected so that there is no empty space between images. Additional details regarding strict area style layouts and brick style layouts may be obtained from copending U.S. patent application Ser. No. 10/675,724, filed Sep. 30, 2004, and U.S. patent application Ser. No. 10/675,823, filed Sep. 30, 2004.

II. GENERAL FRAMEWORK FOR CONSTRAINT-BASED GRAPHIC ELEMENT ALBUMING

Figure 4:
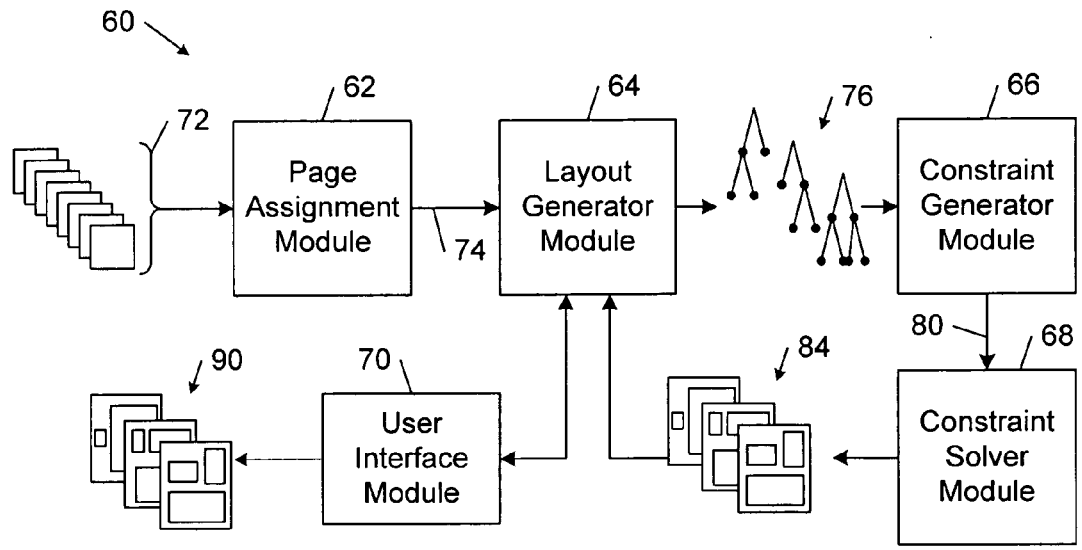
FIG. 4 is a block diagram of an embodiment of an albuming system for arranging graphic elements on pages of an album.

FIG. 4 shows an embodiment of an albuming system 60 that includes a page assignment module 62, a layout generator module 64, a constraint generator module 66, a constraint solver module 68, and a user interface module 70 through which a user interacts with the albuming system 60. In general, the modules 62-70 of the albuming system 60 are not limited to any particular hardware or software configuration, but rather they may be implemented in any computing or processing environment, including in digital electronic circuitry or in computer hardware, firmware, device driver, or software. For example, in some implementations, these modules may be embedded in the hardware of any one of a wide variety of digital and analog electronic devices, including desktop and workstation computers, digital still image cameras, digital video cameras, printers, scanners, and portable electronic devices (e.g., mobile phones, laptop and notebook computers, and personal digital assistants).

In some implementations, computer process instructions for implementing the modules 62-70 and the data generated by the modules 62-70 are stored in one or more machine-readable media. Storage devices suitable for tangibly embodying these instructions and data include all forms of non-volatile memory, including, for example, semiconductor memory devices, such as EPROM, EEPROM, and flash memory devices, magnetic disks such as internal hard disks and removable disks, magneto-optical disks, and CD-ROM.

The page assignment module 62 operates on a collection of graphic assemblies 72, which may be designated by the user or may be identified automatically by the image albuming system 60. The page assignment module 62 assigns the graphic assemblies 72 to one or more pages of an album using any one of a wide variety of page assignment methods. In some approaches, page assignment module 72 assigns the graphic assemblies 72 to pages of an album based on a page-filling criterion, such as a user-specified or default maximum number of graphic assemblies 72 that may be laid out on a page, or a user-specified or default fixed number of pages in an album. In these approaches, the page assignment module 62 may assign the graphic assemblies 72 to pages in accordance with one or more arrangement criteria, such as a user-specified arrangement of graphic assemblies or a default arrangement rule that is specified in terms of meta data that is associated with the graphic assemblies 72. For example, the page assignment module 62 may assign graphic assemblies 72 to pages chronologically based on date and time meta data that is associated with the graphic assemblies 72. Alternatively, the page assignment module 62 may assign graphic assemblies 72 to pages based on an event-based analysis of the graphic assemblies 72.

The layout generator module 64 receives from the page assignment module 62 graphic assembly data 74 specifying the assignments of graphic assemblies 72 to the pages of an album. The layout generator module 64 generates candidate relative layouts 76 of the graphic assemblies 72 on each album page based on the image assignment data 74 as well as hierarchical page partitions that are computed for the album pages. As used herein, the term "relative layout" refers to a layout of graphic elements on an album page in which the relative positions of the graphic elements are specified but the absolute positions of the graphic elements are not specified. The page partitions provide explicit control over the relative areas of the graphic assemblies 72 on the album pages.

Figure 5:
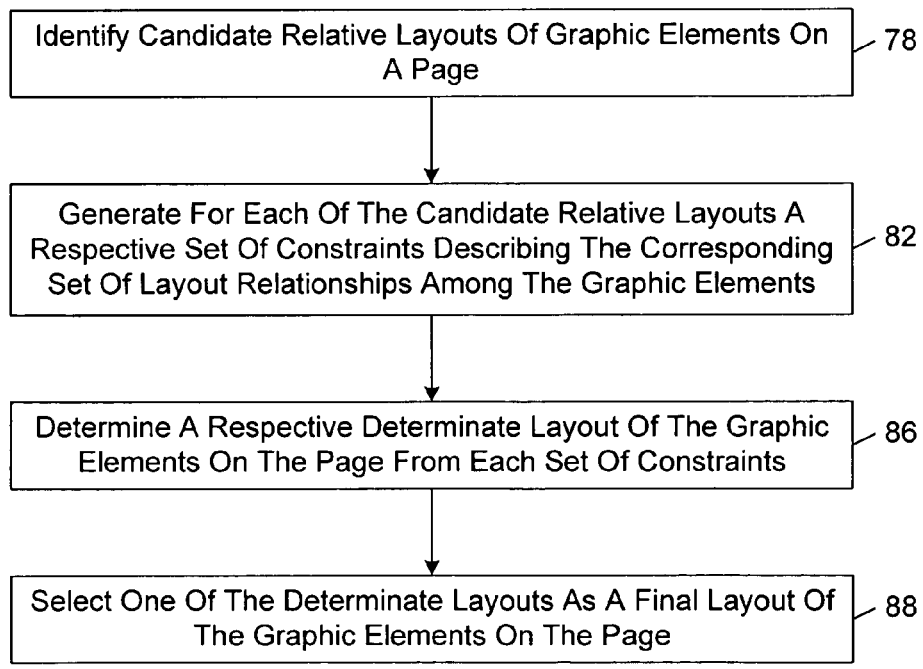
FIG. 5 is a flow diagram of an embodiment of a method of generating a layout of graphic elements on the pages of an album.

FIG. 5 shows an embodiment of a method by which the layout generator module 64, the constraint generator module 66, and the constraint solver module 68 cooperatively generate a layout of graphic elements on the pages of an album.

In the embodiment shown in FIG. 5, the layout generator module 64 identifies candidate relative layouts 76 of graphic elements on a page (block 78). Each of the candidate relative layouts 76 describes a respective set of layout relationships among the graphic elements. In some implementations, the layout generator module 64 stores the specifications of each relative page layout in a respective data structure that represents a binary tree, which has leaf nodes corresponding to graphic elements and interior nodes corresponding to divisions of the corresponding page.

The constraint generator module 66 generates for each of the candidate relative layouts 76 a respective set of constraints 80 describing the corresponding set of layout relationships among the graphic elements (block 82). Each set of constraints 80 describes the relationships among the graphic elements in each of the candidate relative layouts 76 that is generated by the layout generator module 64. In general, the constraints that are generated by the constraint generator module 66 may be expressed in any suitable mathematical form that is capable of describing the layout and geometric relationships among the graphic elements, such as above, below, left of, and right of. In the illustrated embodiments, the constraints 80 correspond to linear equality and inequality objectives and constraints.

The constraint solver module 68 determines a respective determinate layout 84 of the graphic elements on the page from each set 80 of constraints (block 86). As used herein, the term "determinate layout" refers to a layout of graphic elements on an album page in which the positions and dimensions of the graphic elements are specified. The constraint solver module 68 generates determinate layouts 84 of the graphical elements on the album pages by solving the sets of constraints 80 that are generated by the constraint generator module 66. The constraint solver module 68 may be implemented by any one of a wide variety of different constraint solving systems. In the illustrated embodiments, the constraint solver module 68 is implemented by a simplex-based linear solver system.

The layout generator module 64 selects one of the determinate layouts 84 as a final layout of the graphic elements on the current album page (block 88). In general, the layout generator module 64 may select the final determinate layout using any one of a wide variety of different selection criteria and methods. In some implementations, the constraint solver module 68 renders the selected final layout in a predetermined final layout format (e.g., PDF).

After receiving the rendering of the final layout from the constraint solver module 68, the layout generator module 64 passes the selected final layout of the graphic elements on the page to the user interface module 70. In some implementations, the user interface module 70 allows a user to interactively browse the album 90 that is generated automatically by the albuming system 60. The user interface module 70 also allows a user to specify edits to the album 90. Any specified edits to a given page of the album 90 are interpreted by the user interface module 70. The user interface module 70 transmits the interpreted user command instructions to the layout generator module 64. The layout generator module 64, the constraint generator module 66, and the constraint solver module 68 repeat the method of FIG. 5 to determine another final layout in accordance with the edits received from the user interface module 70. The user interface module 70 presents the revised album to the user, who may browse the revised album, specify edits to the revised album, or command the albuming system 60 to render some or all of the pages of the revised album.

III. IDENTIFYING CANDIDATE RELATIVE LAYOUTS

A. Generating Tree Structures

Figure 6:
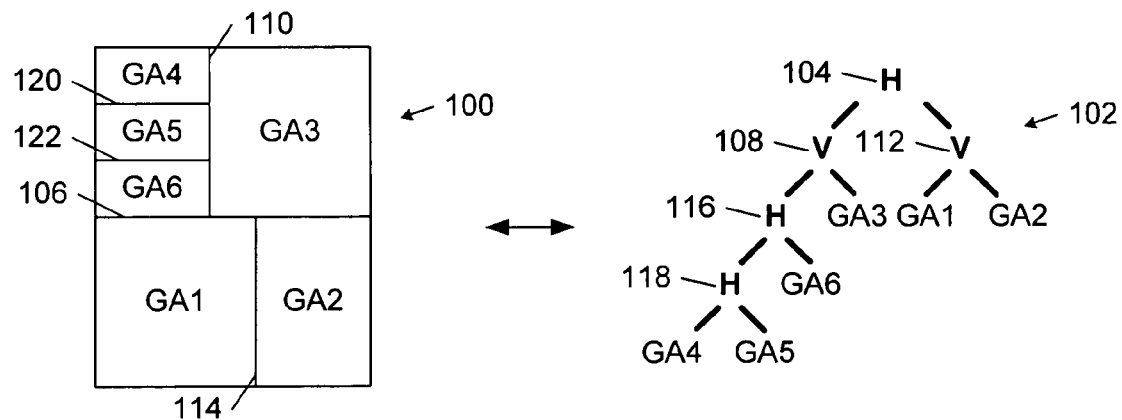
FIG. 6 is a diagrammatic view of a partition of a page and a hierarchical tree structure corresponding to the page partition.

Referring to FIG. 6, the layout generator module 64 divides each page 100 in an album in accordance with a respective candidate relative layout, which is represented by a corresponding tree structure 102. Each leaf node of the tree structure 102 corresponds to a respective graphic assembly (GA1, GA2, GA3, GA4, GA5, GA6) on the page 100. Each interior node (H, V) of the tree structure 102 corresponds to one of either a horizontal or a vertical division on the corresponding page 100. In the exemplary candidate relative layout of page 100 and the corresponding tree structure 102, the root H node 104 represents the horizontal division 106 of page 100. The left interior V node 108 represents the upper vertical division 110 of page 100, and the right interior V node 112 represents the lower vertical division 114 of page 100. The interior H nodes 116, 118 respectively represent the horizontal divisions 122, 120 of page 100. The positions of leaf nodes in the tree structure 102 specify the unique relative locations of the corresponding graphic assemblies (GA1, GA2, GA3, GA4, GA5, GA6) on the page 100.

Figure 7A:
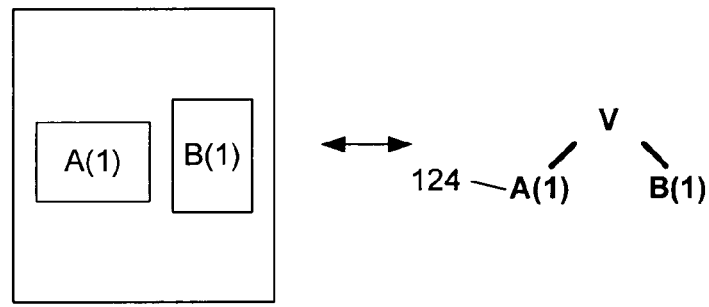
FIGS. 7A-7C are diagrammatic views of different partitions of a page and corresponding hierarchical tree structures.
Figure 7B:
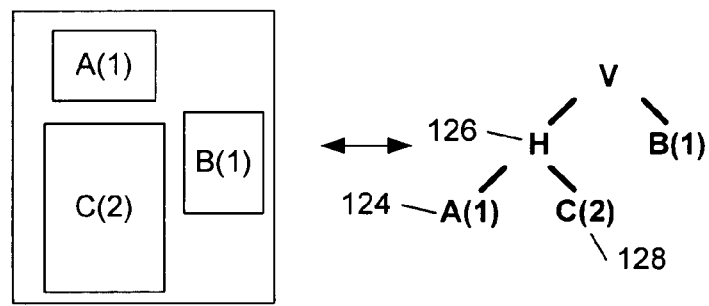
Figure 7C:
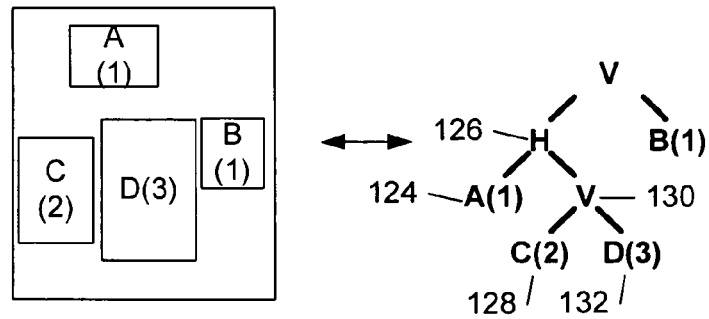

FIGS. 7A-7C illustrate a process of generating a binary tree structure by adding one graphic assembly to the current tree structure at a time, where the numbers in parentheses are the relative areas assigned to the corresponding graphic assemblies A, B, C, D. In this process, each node in the tree structure is associated with a bounding box in the layout of a page. Each interior node is associated with a bounding box around the boxes of its two child nodes, and each leaf node is associated with a cell where a respective graphic assembly is to be placed.

The tree structure generation process begins with a single graphic assembly, and additional graphic assemblies are added to the tree structure one at a time until all of the graphic assemblies that are assigned to the page have been added. If the total number of graphic assemblies assigned to a page is M, the layout for the page corresponds to the last in an increasing sequence of binary trees:

$$T(1), T(2), \ldots, T(M) \qquad (2)$$

where $T(p)$ for $p \geq 1$ denotes a tree with p terminal nodes. Each of the intermediate trees $\{T\{p\}: 1 \leq p \leq N-1\}$ generates a viable layout.

Each new graphic assembly is added to the tree structure by introducing a new cell to the previous layout. Thus, graphic assembly C is added to the sub-tree structure 124 shown in FIG. 7A by displacing the sub-tree structure 124 with a new interior H node 126 shown in FIG. 7B. The new interior H node 126 becomes the parent of a new leaf node 128 corresponding to the new cell C(2) and the sub-tree 124 that was displaced. Similarly, the graphic assembly D is added to the sub-tree structure 128 shown in FIG. 7B by displacing the sub-tree structure 128 with a new internal V node 130 shown in FIG. 7C. The new internal V node 130 becomes the parent of a new leaf node 132 corresponding to the new cell D(3) and the sub-tree 128 that was displaced. In the example illustrated in FIGS. 7A-7C, the selected sub-trees 124 and 128 that are displaced happened to be leaf nodes; in general, however, any sub-trees could have been selected, including sub-trees that are rooted at interior nodes. A sub-tree is defined as a node, designated as the sub-tree root, taken together with all the nodes that emanate from it. If the sub-tree root is an interior node, then the sub-tree includes both interior nodes and the terminal nodes that are its children.

As explained in detail below, the layout generator module 64 selects which cell is introduced into a previous layout by evaluating a collection of candidate relative layouts corresponding to all possible presentations of the new graphic assembly in each of the available new cell locations. Before each of the candidate relative layouts is evaluated, however, the coarse graphic assembly tree structures corresponding to the candidate relative layouts are expanded (or translated) into refined (or complete) tree structures containing the constituent graphic elements of the graphic assemblies.

Figure 8A:
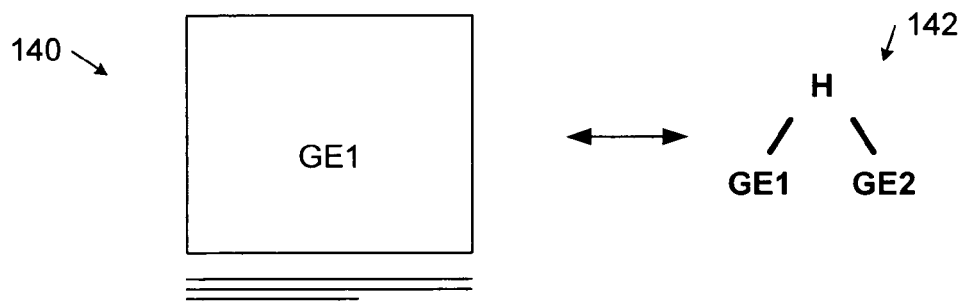
FIG. 8A is a diagrammatic view of a presentation of a first graphic assembly and a tree structure describing the presentation.
Figure 8B:
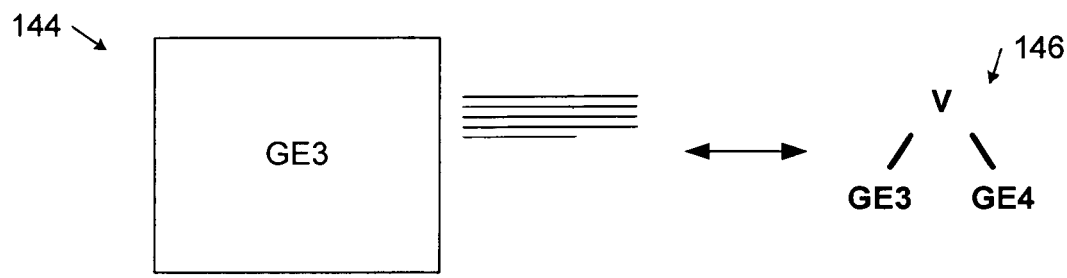
FIG. 8B is a diagrammatic view of a presentation of a second graphic assembly and a tree structure describing the presentation.
Figure 8C:
FIG. 8C is a diagrammatic view of a coarse tree structure containing leaf nodes corresponding to the first and second graphic assemblies shown in FIGS. 8A and 8B and a corresponding refined tree structure derived from the coarse tree structure.
Figure 8D:
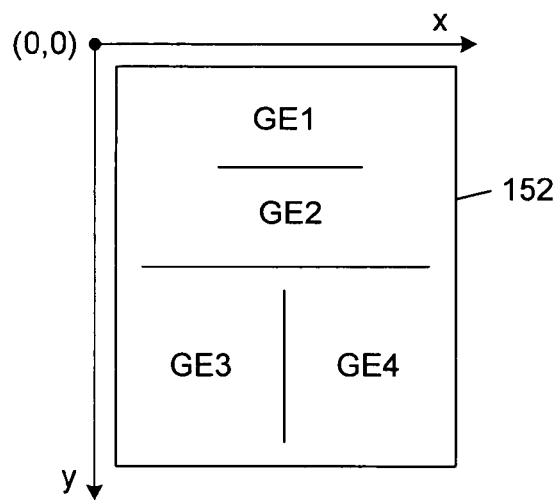
FIG. 8D is a relative layout of graphic elements on a page corresponding to the coarse and refine tree structures shown in FIG. 8C.

In one exemplary illustration, FIG. 8A shows one presentation of a graphic assembly 140 and its corresponding tree structure 142. FIG. 8B shows one presentation of a graphic assembly 144 and its corresponding tree structure 146. FIG. 8C shows a coarse tree structure 148 that consists of a horizontal root node and two terminal nodes corresponding to the graphic assembly presentations 140, 144 shown in FIGS. 8A and 8B. The coarse tree structure 148 is expanded into a refined tree structure 150 by substituting the tree structures 142, 146 for the terminal nodes representing the graphic assembly presentations 140, 144, as shown in FIG. 8C. FIG. 8D shows the resulting candidate relative layout corresponding to the refined tree structure 150 in an album page 152.

Figure 9A:
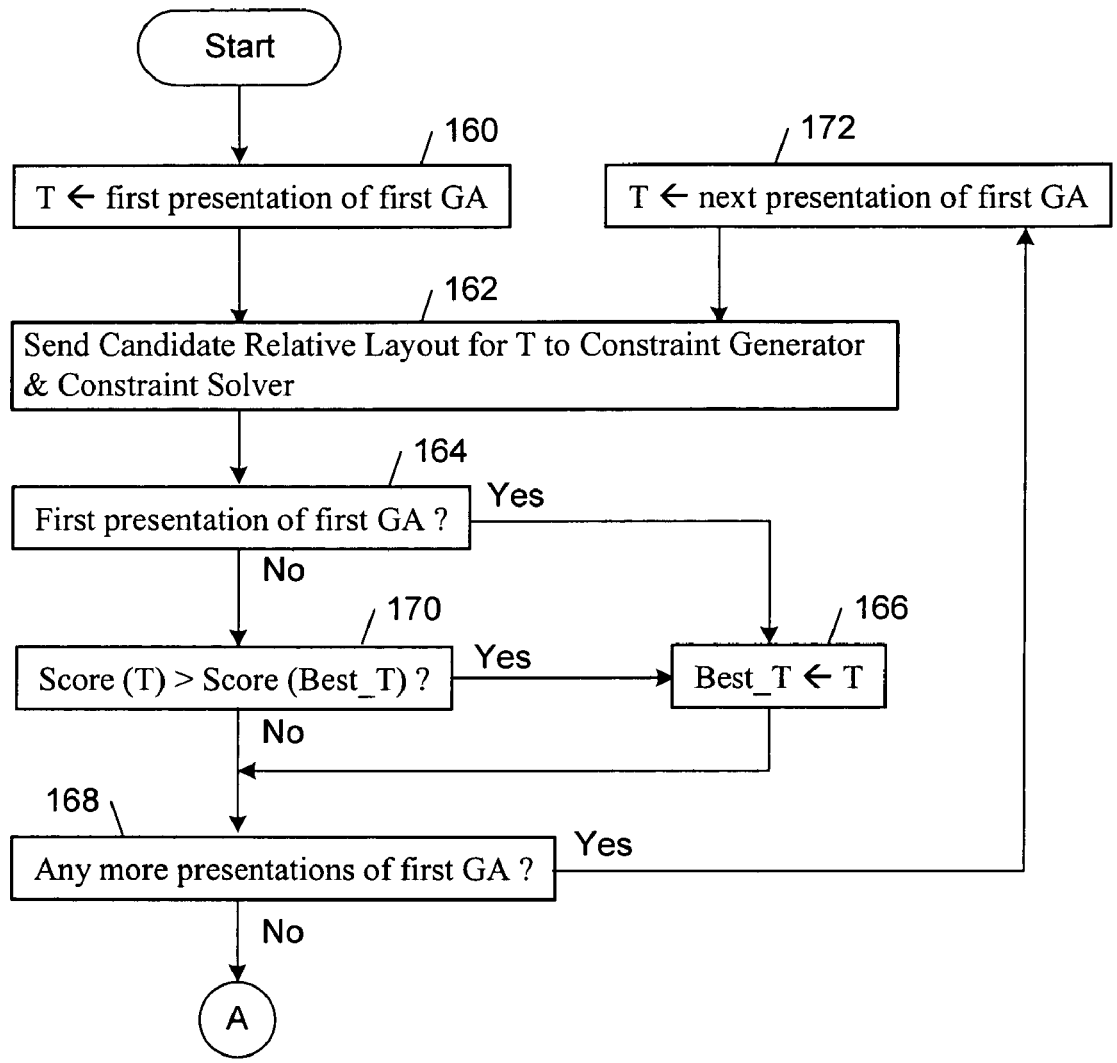
FIGS. 9A and 9B are respective flow diagrams of first and second portions of an embodiment of a method of generating a layout of graphic elements on a page of an album.
Figure 9B:
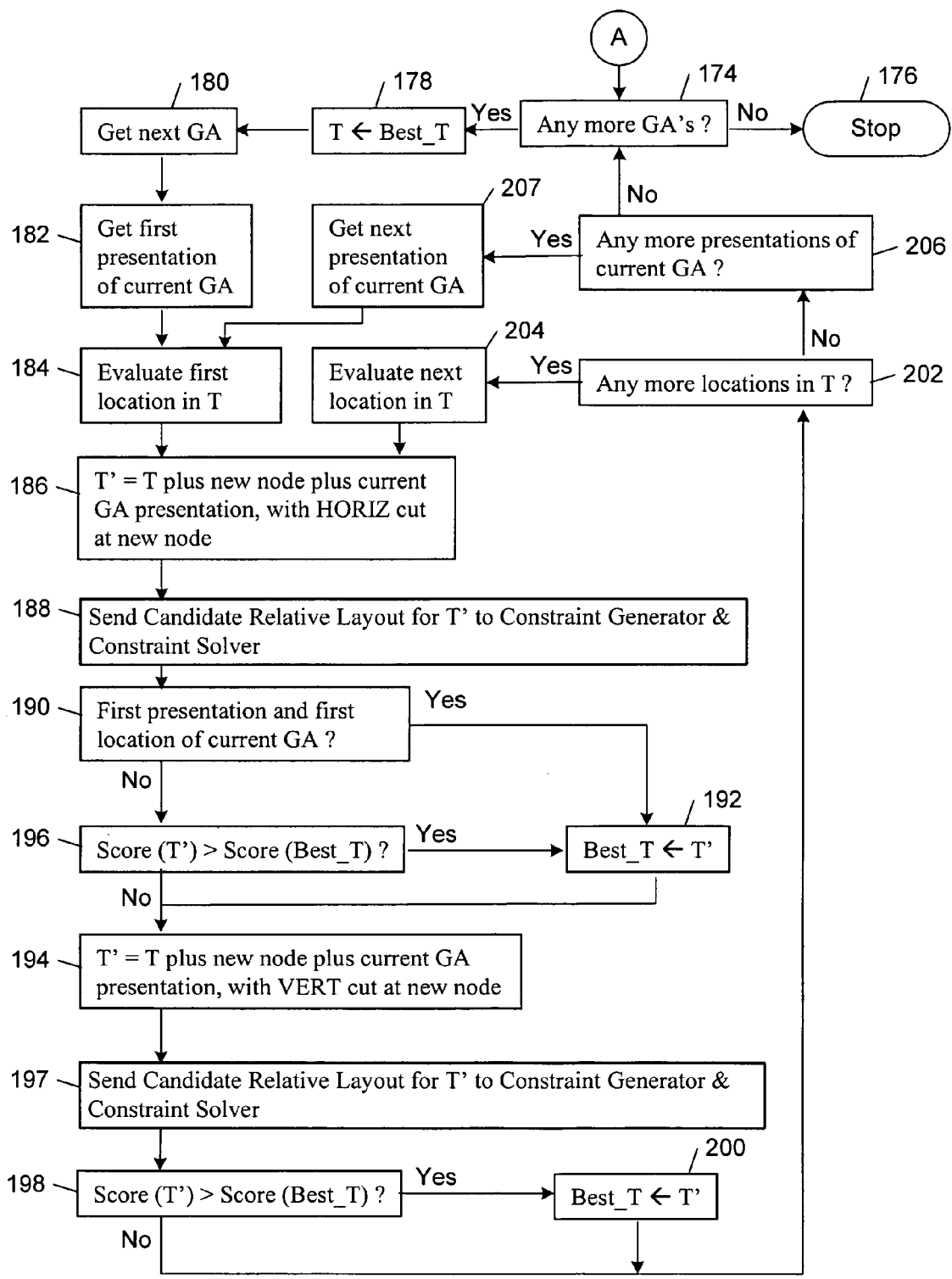

FIGS. 9A and 9B show an embodiment of a method by which the layout generator module 64 identifies candidate relative layouts and selects one of the determinate layouts 84 generated by the constraint solver module 68 as a final layout of graphic elements on a page.

Block 160 initializes a current candidate layout T with a first presentation of the first graphic assembly (GA). Block 162 sends the current candidate layout T to the constraint generator module 66 and the constraint solver module 68. As explained in detail below, the constraint generator module 66 generates a set of constraints describing the layout relationships among the graphic elements in the current candidate layout. The constraint solver module 68 solves the set of constraints and returns to the layout generator module 64 a determinate layout corresponding to the current candidate layout. The determinate layout includes a set of absolute dimensions and page locations for each of the graphic elements in the current candidate layout.

Block 164 determines whether this is the first presentation of the first graphic assembly. If this is the first presentation of the first graphic assembly, block 166 designates tree T as the current best layout, Best_T, and proceeds to block 168. If this is not the first presentation of the first graphic assembly, block 170 computes a score, Score(T), for the determinate layout corresponding to the current candidate layout and compares Score(T) to a score, Score(Best_T), for the layout corresponding to the best tree where scoring may be performed in the manner described below. If Score(T) is greater than Score (Best_T), block 166 designates the current candidate layout T as the new Best_T, and proceeds to block 168. If Score(T) is not greater than Score(Best_T), the best current candidate layout designation is not changed, and the process proceeds to block 168.

Block 168 determines whether any additional presentations of the first graphic assembly are available. If more presentations of the first graphic assembly are available, block 172 retrieves the next presentation of the first graphic assembly to form a new current candidate layout T and the process is repeated for the new current candidate layout. If block 168 determines that there are no additional presentations of the first graphic assembly, the process proceeds to block 174 in FIG. 9B.

Block 174 determines whether there are any more graphic assemblies to be added to the current candidate layout. If there are no more graphic assemblies to be added to the current candidate layout, the current Best_T is selected as the final determinate layout and the process terminates at block 176.

If block 174 determines there are additional graphic assemblies to be added to the current candidate layout, then block 178 designates the current best layout, Best_T, as the new current candidate layout T. Block 180 retrieves the next current graphic assembly. Block 182 retrieves (or determines) the first presentation of the current graphic assembly. Block 184 selects a first location in the current candidate layout T at which to evaluate the current graphic assembly presentation. The location may be either an internal node or an external node (i.e., leaf) of the current candidate layout T. At block 186, an alternate candidate layout T' is created by adding a new node at the first location. One child of the new node is the subtree of the current candidate layout T whose root is the location in T. The other child of the new node is the current presentation of the current graphic assembly being added to the layout. In the alternate current candidate layout T', a horizontal division is assigned to the new node.

Block 188 sends the alternate candidate layout T' to the constraint generator module 66 and the constraint solver module 68. As explained in detail below, the constraint generator module 66 generates a set of constraints describing the layout relationships among the graphic elements in the alternate candidate layout T'. The constraint solver module 68 solves the set of constraints and returns to the layout generator module 64 a determinate layout corresponding to the alternate candidate layout T'. The determinate layout includes a set of absolute dimensions and page locations for each of the graphic elements in the alternate candidate layout T'.

Block 190 determines if this is the first location and first presentation of the current graphic assembly. If this is the first location and first presentation of the current graphic assembly, block 192 designates the alternate candidate layout T' as the best current layout, Best_T, and proceeds to block 194. If this is not the first location and first presentation of the current graphic assembly, block 196 computes a score, Score(T'), for the determinate layout corresponding to the alternate current layout T' and compares Score(T') with a score, Score(Best_T), for the layout corresponding to the best current layout where scoring may be performed in the manner described below. If Score(T') is greater than Score(Best_T), (indicating the alternate candidate layout T' is better than the current candidate layout T), then block 192 designates T' as the best current layout, Best_T, and the process proceeds to block 194. If Score(T') is less than or equal to Score(Best_T), the best current layout designation is not changed and operation proceeds to the same block 194.

At block 194, another alternate current layout T' is created by adding a new node in the place of the current location. One child of the new node is the subtree of T whose root is the location of T. The other child of the new node is the current presentation of the graphic assembly currently being added to the layout. In the alternate current layout T' of block 194, a vertical division is assigned to the new node.

Block 197 sends the alternate candidate layout T' to the constraint generator module 66 and the constraint solver module 68. As explained in detail below, the constraint generator module 66 generates a set of constraints describing the layout relationships among the graphic elements in the alternate candidate layout T'. The constraint solver module 68 solves the set of constraints and returns to the layout generator module 64 a determinate layout corresponding to the alternate candidate layout T'. The determinate layout includes a set of absolute dimensions and page locations for each of the graphic elements in the alternate candidate layout T'.

Block 198 determines a score, Score(T'), for the layout corresponding to the alternate candidate current layout T' and compares Score(T') with Score(Best_T). Blocks 170, 196, 198 may use the same or different scoring methods. If the Score(T') is greater than Score(Best_T), block 200 designates alternate current layout T' as the best current layout, Best_T, and the process proceeds to block 202. If block 198 determines the score of T' is not greater than the score of Best_T, the process proceeds directly to block 202.

Block 202 determines whether there are any additional locations available in the current candidate layout T. If additional locations are available in current lo candidate layout T, block 204 selects a new location in the current candidate layout T at which to evaluate the current graphic assembly presentation. Blocks 186 through 202 are repeated using the same current graphic assembly presentation.

When block 202 determines that no additional locations are available in the candidate layout T, the process proceeds to block 206. Block 206 determines whether there are any additional presentations of the current graphic assembly to consider. If additional presentations of the graphic assembly are available, the process proceeds to block 207, which retrieves the next presentation of the current graphic assembly. Block 184 selects the first location in the current candidate layout T at which to evaluate the current graphic assembly presentation. Blocks 186-204 evaluate the next presentation of the current graphic assembly T in each available location in the current candidate layout T.

When block 206 determines that there are no more presentations of the current graphic assembly to consider, the process proceeds to block 174, which determines if there are any additional graphic assemblies to be added to the current candidate layout. When block 174 determines there are no more graphic assemblies to be added to the current candidate layout, the current Best_T is selected as the final determinate layout and the process terminates at block 176.

B. Generating Paths

Figure 10:
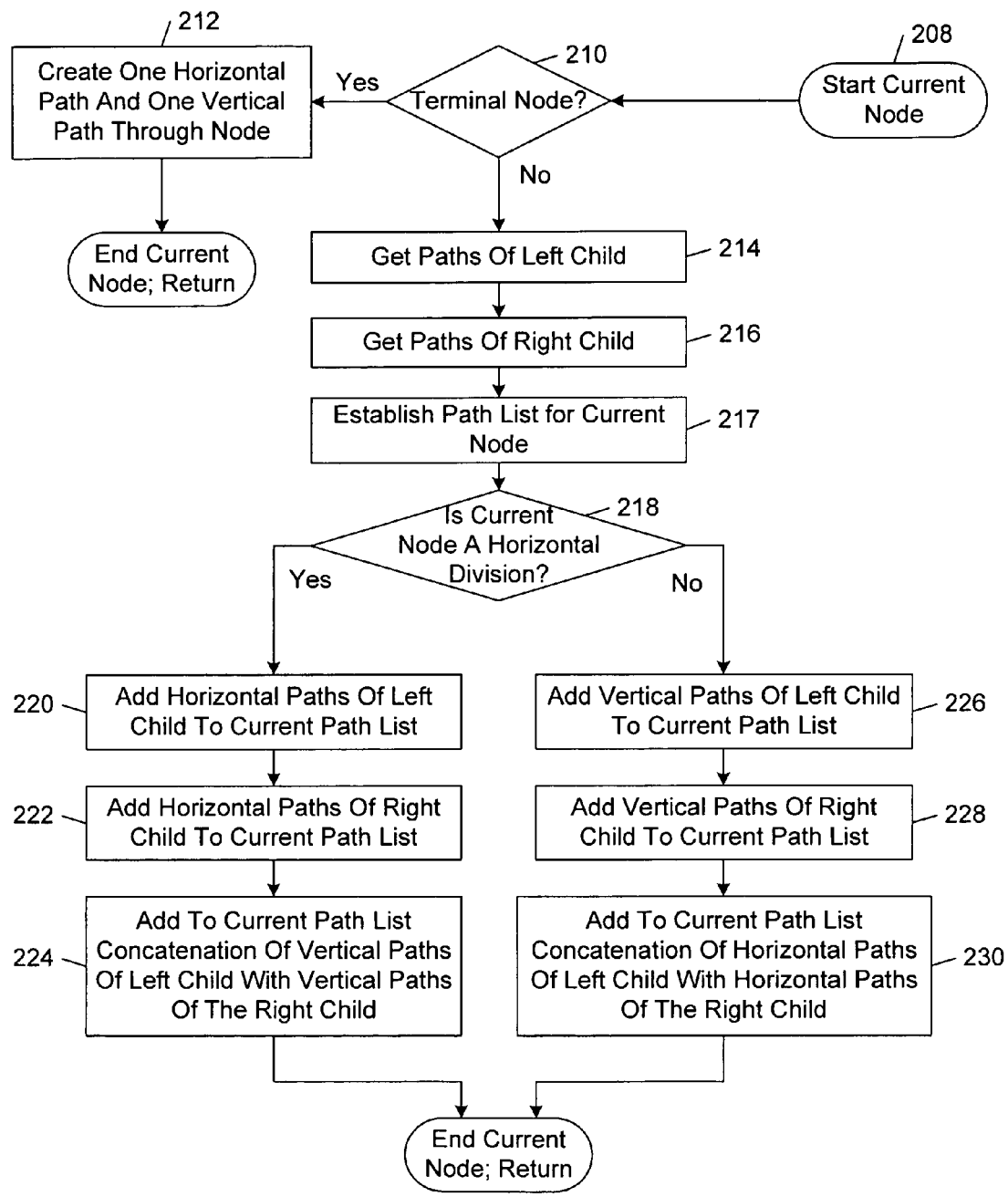
FIG. 10 is a flow diagram of an embodiment of a method of generating a set of paths through relative layouts of graphic elements on a page.

In one embodiment, before the layout generator module 64 sends the candidate relative layouts to the constraint generator module 66 and the constraint solver module 68 in blocks 166, 188, and 197 in the method shown in FIGS. 9A and 9B, the layout generator module 64 determines a complete collection of paths across the candidate relative layouts. FIG. 10 shows a flow diagram of an embodiment of a method of generating a set of paths through a relative layout of graphic elements on a page.

1. Overview of Path Generation Method

Briefly, the path generation method of FIG. 10 is executed once for each node in the tree structure corresponding to the relative layout. That is, each node is in its turn the "current node" with respect to which a respective instance of the path generation method begins at block 208. The output of each instance of the path generation method is a set of paths that correspond to the current node. When a current node is a terminal node (i.e., a leaf node), two new paths are established for the current node in block 212. When a current node is an interior node, the current instance of the method is divided into two stages. In the first stage, respective instances of the method are executed for the left and right child nodes of the current node in blocks 214 and 216. In the second stage, the paths for the left and right child nodes are combined to form the paths of the current node in blocks 218-230. When a node is the root node, the paths that result from the corresponding instance of the path generation method are a complete set of paths for the relative layout being processed.

2. Detailed Description of Path Generation Method

Initially, the path generation method begins at block 208 with the root node of a given candidate relative layout. The path generation method recursively determines the paths for each of the interior and terminal nodes to obtain a complete set of paths through the current candidate relative layout. In the recursive process, the current node is input into the process and a decision is made at block 210 whether or not the current node is a terminal node.

If the current node is a terminal node, two new paths are started at block 212: a horizontal path with a single step traveling through the graphic element associated with the terminal node (e.g., from left to right), and a vertical path with a single step traveling through the graphic element (e.g., from top to bottom). After block 212, the instance of the path generation method that is associated with the current terminal node is complete.

If the current node is not a terminal node (block 210), blocks 214 and 216 submit the two child nodes of the current internal node (i.e., the left child node and the right child node) as current nodes that are processed beginning at node 208 in respective instances of the path generation method. The instance of the method being executed for the current parent node is on hold during the execution of the instances of the method for the child nodes. In the illustrated embodiment, the instance of the path generation method for the right child is executed after the instance of the path generation method for the left child is completed. The results of the instances of the path generation method that are executed for the left and right child nodes are two sets of paths.

In blocks 217-230, the paths that are determined for the two child nodes are combined. Block 217 establishes a path list for the current node. Block 218 determines if the current internal node represents a horizontal division or a vertical division. If the internal node represents a horizontal division, then the node inherits the horizontal paths of its children (blocks 220, 222) and combines the vertical paths of its children (block 224). In particular, if the current internal node represents a horizontal division, then the current internal node inherits each of the $N_{LH}$ horizontal paths of its left child (block 220), and each of the $N_{RH}$ horizontal paths of its right child (block 222). At block 224, the current internal node obtains a new set of vertical paths by concatenating each of the $N_{LV}$ vertical paths of the left-hand child in its turn with each of the $N_{RV}$ vertical paths of the right-hand child to form ($N_{LV} * N_{RV}$) vertical paths of the current node. The total number of paths is equal to $N_{LH}+N_{RH}+(N_{LV} \times N_{RV})$.

If the internal node represents a vertical division, then the node inherits the vertical paths of its children (blocks 226, 228), and combines the horizontal paths of its children (block 230). In particular, if the internal node represents a vertical division, then the node inherits each of the $N_{LV}$ vertical paths of its left child (block 226), and each of the $N_{RV}$ vertical paths of its right child (block 228). At block 230, the node obtains a new set of horizontal paths by concatenating each of the $N_{LH}$ horizontal paths of the left-hand child in its turn with each of the $N_{RH}$ horizontal paths of the right-hand child, to form ($N_{LH} \times N_{RH}$) horizontal paths of the current node. The number of paths is thus equal to $N_{LV}+N_{RV}+(N_{LH} \times N_{RH})$.

When a given instance of the path generation method that is being executed for a node is completed (e.g., after blocks 212, 224, and 230), process control returns to the instance that invoked the given instance. When the instance initiated for the root node is completed, the set of paths associated with the root node is the complete set of paths for the relative layout and the path generation method terminates.

3. Application of the Path Generation Method to an Exemplary Candidate Relative Layout This section shows the paths that are generated by the path generation method of FIG. 10 for the respective nodes of a tree structure 232 corresponding to an exemplary candidate relative layout 233.

Figure 11A:
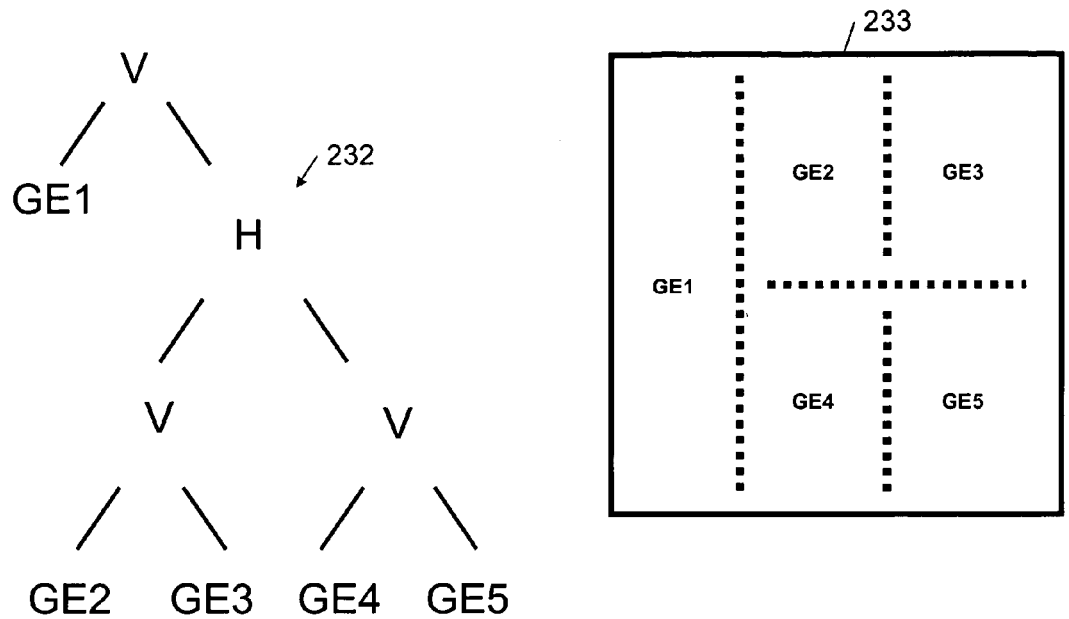
FIGS. 11A-11J show sets of paths generated in accordance with the method of FIG. 10 with respect to an exemplary candidate relative layout.

FIG. 11A shows the tree structure 232 and the corresponding candidate relative layout 233 before the path generation process begins. The horizontal and vertical divisions in the candidate relative layout 232 are shown as dashed lines.

Each of the FIGS. 11B-11J, shows a respective version of the tree structure 232 in which the paths that have been generated up to the completion of an instance of the path generation method for a respective current node, which is circled in the drawings, are shown at the corresponding node locations. The corresponding paths are shown as arrows that are superimposed over the relative layout 233. In the tree structures, each of the paths is denoted by an arrow preceding a respective list of graphic elements. An arrow pointing right preceding a list of graphic elements indicates a horizontal path through the graphic elements. An arrow pointing down preceding a list of graphic elements indicates a vertical path through the graphic elements. For example, "→GE4" indicates a horizontal path through the graphic element GE4; and "→GE4, GE5" indicates a horizontal path through graphic elements GE4 and GE5.

Figure 11B:
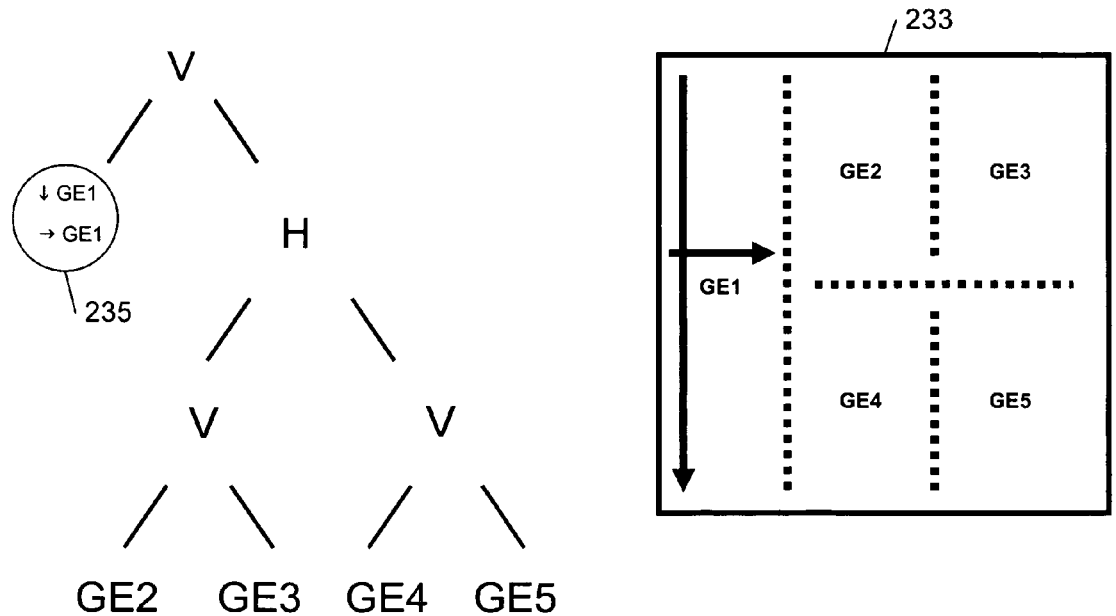

FIG. 11B shows the horizontal and vertical paths that are created in block 212 through the terminal node 235 corresponding to graphic element GE1.

Figure 11C:
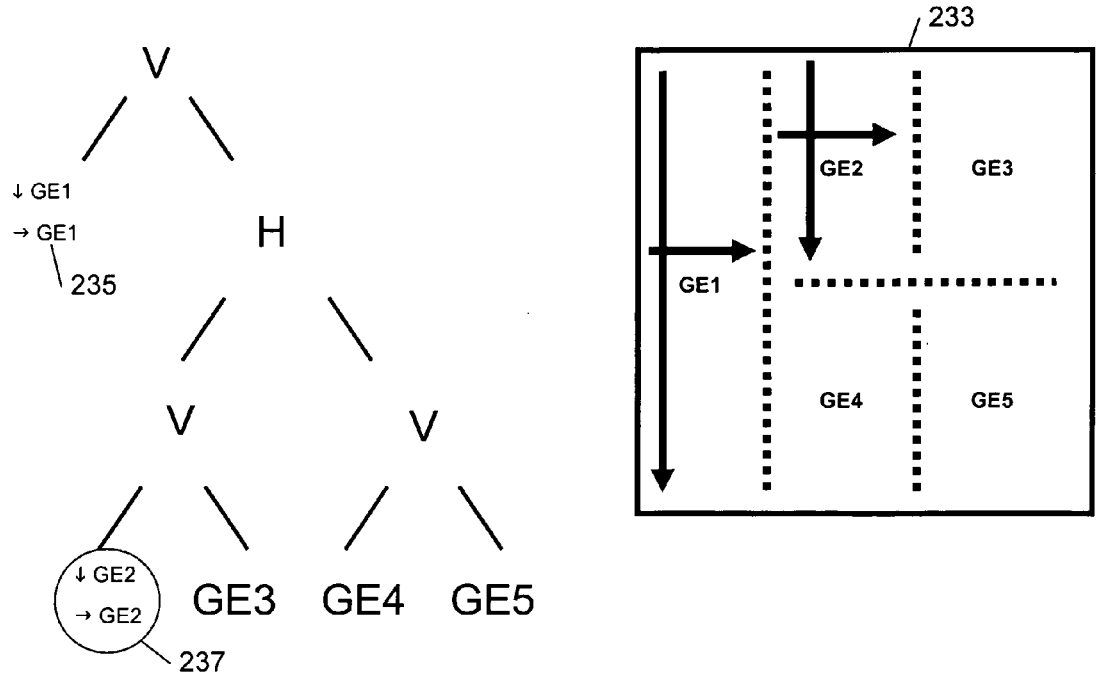
Figure 11D:
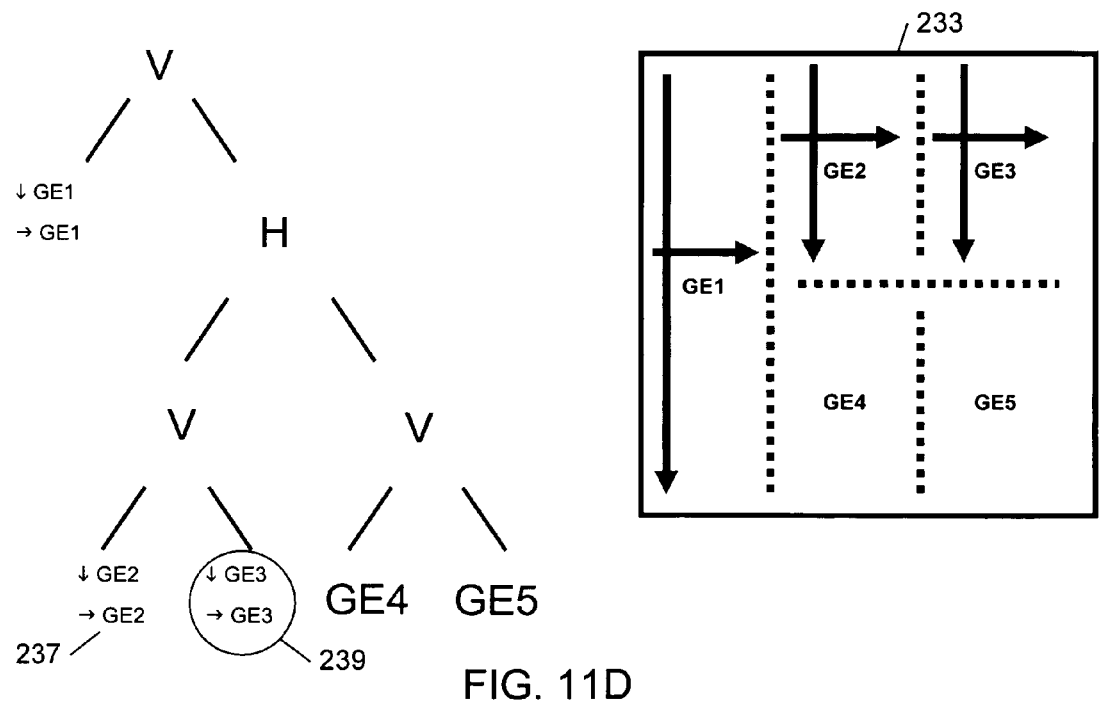
Figure 11E:
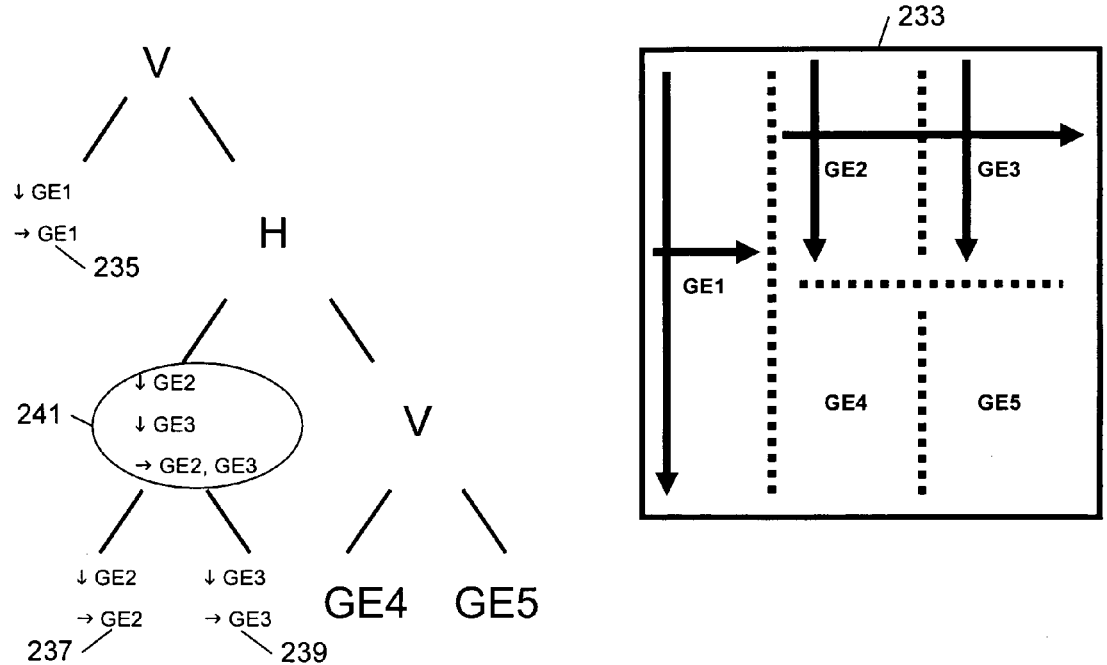

FIG. 11C shows the horizontal and vertical paths that are created in block 212 through the terminal node 237 corresponding to graphic element GE2. FIG. 11D shows the horizontal and vertical paths that are created in block 212 through the terminal node 239 corresponding to graphic element GE1. FIG. 11E shows at the vertical parent node 241 the combination of the paths through GE2 and GE3 that is generated in blocks 220-224 for the vertical parent node 241.

Figure 11F:
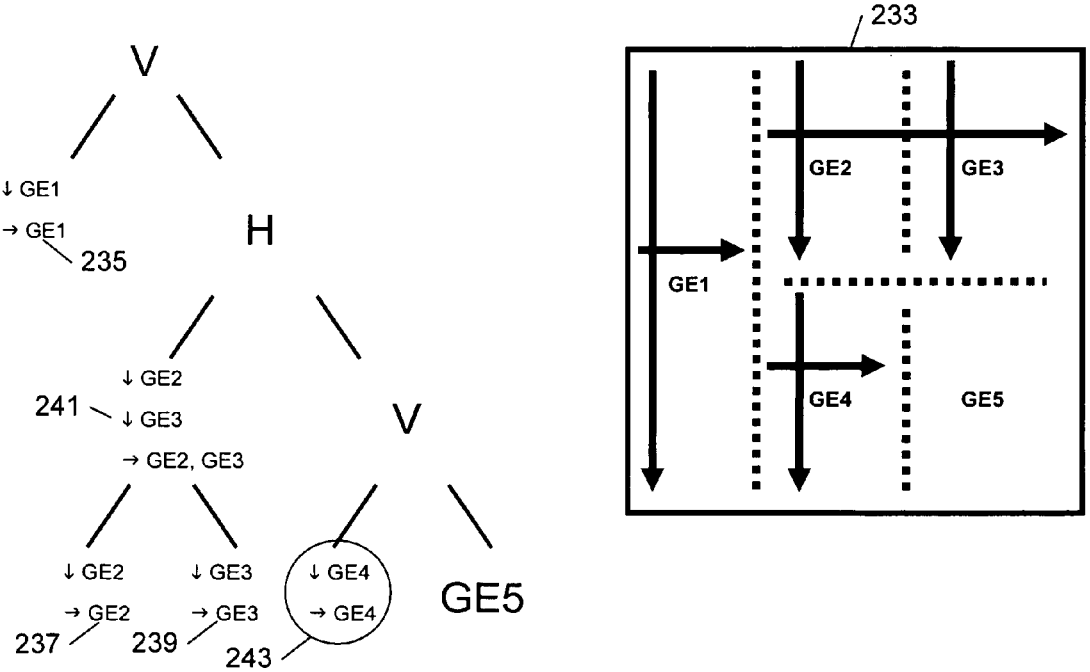
Figure 11G:
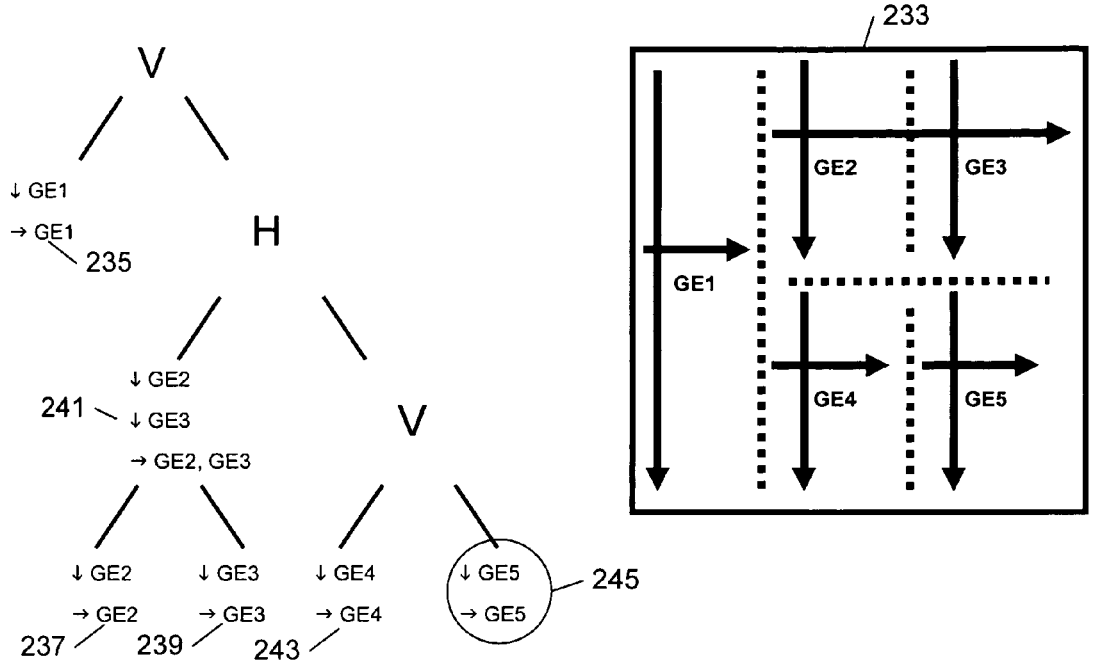
Figure 11H:
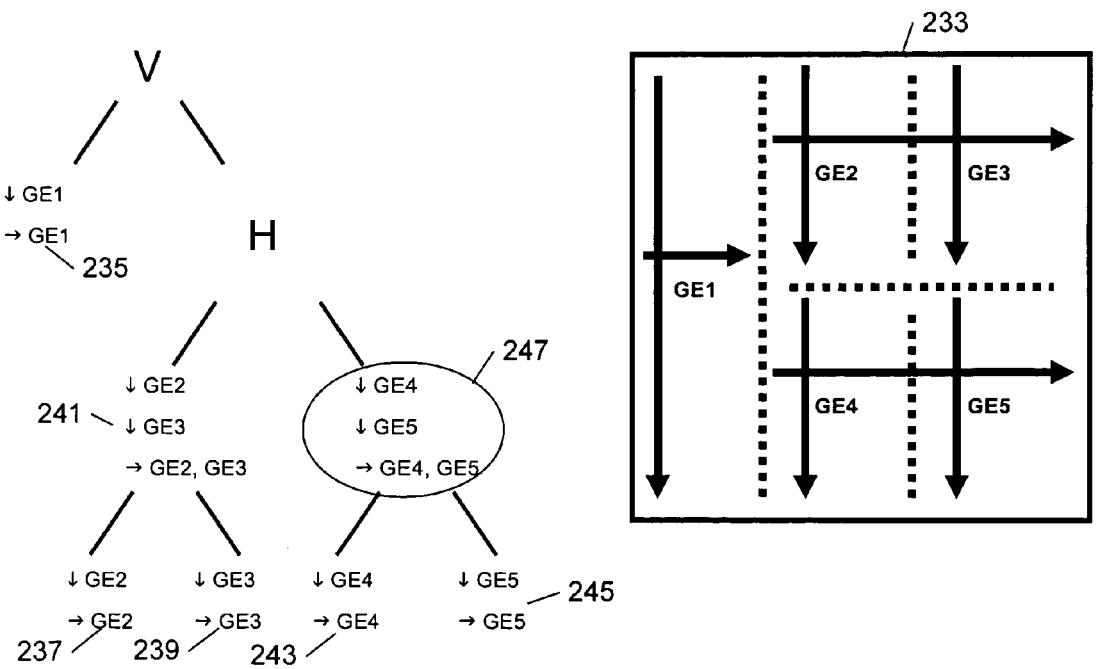

FIG. 11F shows the horizontal and vertical paths that are created in block 212 through the terminal node 243 corresponding to graphic element GE4. FIG. 11G shows the horizontal and vertical paths that are created in block 212 through the terminal node 245 corresponding to graphic element GE5. FIG. 11H shows at the vertical parent node 247 the combination of the paths through GE2 and GE3 that is generated in blocks 220-224 for the vertical parent node 247.

Figure 11I:
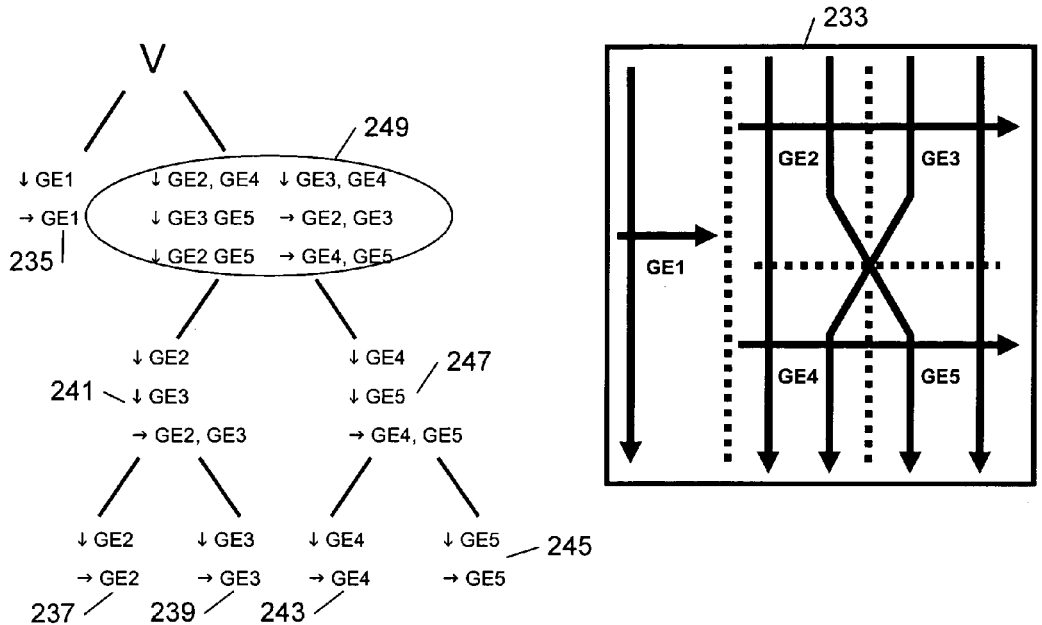

FIG. 11I shows at the horizontal parent node 249 the combination of the paths through the vertical nodes 241, 247 that is generated in blocks 226-230 for the horizontal parent node 249.

Figure 11J:
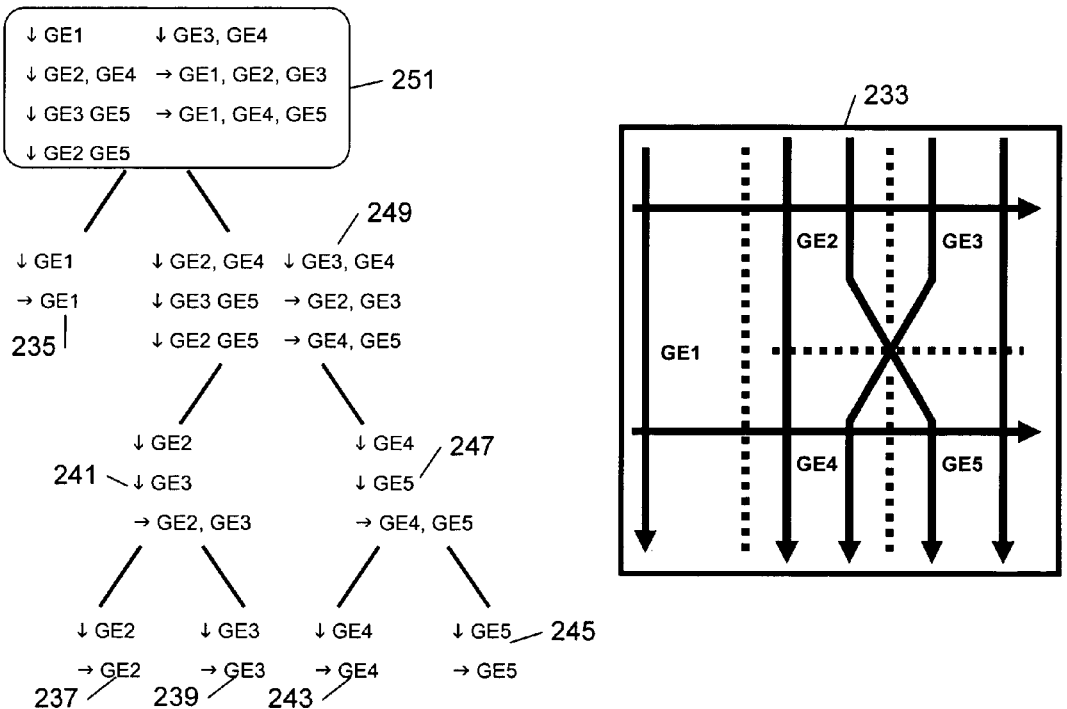

FIG. 11J shows at the vertical root node 251 the complete set of paths through the candidate relative layout 233 corresponding combination of the paths through the terminal node 235 and the vertical node 249 that is generated in blocks 226-230 for the root node 251.

IV. GENERATING CONSTRAINTS DESCRIBING LAYOUT RELATIONSHIPS AMONG GRAPHIC ELEMENTS IN A RELATIVE LAYOUT

As explained above, the constraint generator module 66 generates constraints for each of the candidate relative layouts identified by the layout generator module 64. In general, the constraints describe a corresponding set of layout relationships among the constituent graphic elements. The constraints may be relative constraints describing position relationships, size relationships, and alignment relationships. The constraints also may be global constraints describing global preferences (e.g., maximize coverage) and requirements (e.g., minimal dimensions of graphic elements).

In general, the constraints that are generated by the constraint generator module 66 may be expressed in any suitable mathematical form that is capable of describing the layout and geometric relations among the graphic elements in a candidate relative layout, such as above, below, left of, and right of. In the illustrated embodiments, the constraints correspond to linear equality and inequality objectives and constraints. The following is an exemplary set of constraints that might be generated for the candidate relative layout corresponding to the tree structure 150 shown in FIG. 8C and shown diagrammatically on the album page 152 in FIG. 8D:

GE1 is above GE2
GE3 and GE4 are below GE2
Image block GE1 has the same width as the text block GE2
The height and width of GE3 are the same
The tops of GE3 and GE4 are vertically aligned
GE1 is horizontally aligned with GE2
Image GE1 has at least a predetermined height; image GE3 has at least a predetermined height
Text block GE4 has a minimum width The images are allowed to scale proportionally with unchanged aspect ratios The font of each text block is defined Minimize the total height of the occupied space (have a compact page)

The width and height of each text block are allowed to take any values only if the resulting layout complies with the above constraints.

The constraint generator module 66 may associate with a constraint a strength label that is used by the constraint solver module 68 to prioritize constraints when all of the constraints cannot be satisfied in a given candidate relative layout of graphic elements. The strength labels are selected from a predefined strength hierarchy that compasses strength labels for required constraints and non-required constraints. In one exemplary implementation, the strength hierarchy consists of the following strength labels in order of priority: required, strong, and weak. Rules that are associated with a "required" strength label are referred to herein as "required rules" and rules that are associated with "strong" or "weak" strength labels are referred to herein as "non-required rules".

The constraint generator module 66 may generate one or more of the following types of constraints for each of the candidate relative layouts that is submitted by the layout generator module 64.

A. Constraining Relative Positions of Graphic Elements

In some implementations, the constraint generator module 66 generates constraints that reflect the candidate relative layouts that are received from the layout generator module 64. For example, with respect to the candidate relative layout on album page 152, which is shown in FIG. 8D, the constraint generator module 66 may generate constraints for preserving the following arrangement of the graphic elements GE1, GE2, GE3, and GE4: GE2 is beneath GE1; GE3 is beneath GE2; GE4 is beneath GE2; and GE4 is to the right of GE3.

In some implementations, the constraint generator module 66 generates relative position constraints directly from the set of paths received from the layout generator module 64. For example, the complete set of paths through the candidate relative layout on album page 152 of FIG. 8D is as follows:

P1. (vertical path) GE1→GE2→GE3

P2. (vertical path) GE1→GE2→GE4

P3. (horizontal path) GE1

P4. (horizontal path) GE2

P5. (horizontal path) GE3→GE4

In this path list, each arrow indicates a traversal through a division in the candidate relative layout. In this process, arrows in vertical paths are converted to constraints on the tops and bottoms of graphic elements, whereas arrows in horizontal paths are converted to constraints on the left and right sides of graphic elements. Thus, the constraint generator module 66 processes the above path list and generates a required constraint for each arrow, as follows:

C1. $B(GE1)+DIST \leq T(GE2)$ strength=REQUIRED

C2. $B(GE2)+DIST \leq T(GE3)$ strength=REQUIRED

C3. $B(GE1)+DIST \leq T(GE2)$ strength=REQUIRED

C4. $B(GE2)+DIST \leq T(GE4)$ strength=REQUIRED

C5. $R(GE3)+DIST \leq L(GE4)$ strength=REQUIRED

In this set of constraints, the origin in the coordinate system is at upper left; and the directions to the right and down indicate positive directions. B(X) and T(X) are the bottom and top coordinates for the graphic element X, respectively. DIST is the minimum allowable distance between adjacent graphic elements. In general, the values of DIST do not have to be the same for all types of constraints. In some implementations, the value of DIST is smaller if the adjacent graphic elements are part of the same graphic assembly than if the adjacent graphic elements are part of different graphic assemblies. In one implementation the value of DIST for adjacent graphic elements in the same graphic assembly is set to 0.125 inch and the value of DIST for adjacent graphic elements in different graphic assemblies is set to a value in the range of 0.25-0.33 inch.

With respect to two graphic elements that are part of the same graphic assembly, the constraint generator module 66 generates a WEAK constraint that the two graphic elements should be separated by DIST exactly. For example, if GE1 and GE2 were in the same graphic assembly, the constraint C1 would be rewritten as C1':

C1'. $B(GE1)+DIST=T(GE2)$ strength=WEAK

This feature encourages graphic elements in the same graphic assembly to be positioned closer together.

In the above example, the constraints C1 and C3 are exactly the same. In some implementations, the constraint generator module 66 is configured to eliminate redundant constraints. In general, any process for creating a list that contains no redundant pairs of constraints may be used. In some implementations, the constraint generator module 66 checks to see if a current constraint already is in the list of constraints before adding it to the constraint list. If the current constraint is not equivalent to any constraint already in the list, the current constraint is added to the list; otherwise, it is not added to the list.

B. Constraining Aspect Ratios of Captions

In some implementations, the constraint generator module 66 adds a STRONG constraint specifying that the height of a textual graphic element designated as a caption should be less than or equal to the height of one line of text for each caption that is situated below its corresponding image (or set of images). This feature encourages layouts with short and wide captions as being preferred over layouts with excessively narrow captions.

C. Constraining Dimensions of Graphic Elements

In some implementations, the constraint generator module 66 adds for each graphic element X a REQUIRED constraint that the height and width must be at least the size of prescribed minimum allowable values. That is, $T(X) > B(X)+MIN\_DIM$ strength=REQUIRED $R(X) > L(X)+MIN\_DIM$ strength=REQUIRED where R(X) and L(X) are the right and left coordinates of graphic element X, and MIN_DIM is a positive value that is the minimum value for the horizontal and vertical dimensions of the graphic element X. The value of MIN_DIM may be the same or different for different graphic elements. In some implementations, the MIN_DIM value for images is smaller than the MIN_DIM value for the widths of text blocks. In one exemplary implementation, the MIN_DIM value for images is 0.5 inch, whereas the MIN_DIM value for text block widths is 1-2 inches.

D. Constraining Dimensions of Fixed-Area Images

In some implementations, the constraint generator module 66 adds the following REQUIRED constraints for images that are designated as having fixed areas:

$T(X)-B(X)=image\_height(X)$ strength=REQUIRED $R(X)-L(X)=image\_width(X)$ strength=REQUIRED wherein image_height(X) and image_width(X) are the height and width dimensions that are specified for the fixed-area image X.

E. Constraining Aspect Ratios of Variable-Area Images

In some implementations, the constraint generator module 66 generates for each variable-area image an explicit constraint that the aspect ratio of the image should equal the aspect ratio of the original image. In particular, for each variable-area image, the constraint generator module 66 computes "aspect" as the height of the original image (e.g., in units of pixels) divided by the width of the original image (in the same units as the height), and then generates the following REQUIRED constraint:

$T(X)-B(X)=aspect \times (R(X)-L(X))$ strength=REQUIRED

This feature prevents the constraint solver module 68 from generating determinate layouts in which the aspect ratios of images are changed in ways that cause them to appear squashed or squeezed.

F. Constraining Areas of Variable-Area Images

In some implementations, the constraint generator module 66 constrains the areas of any two variable-area images on the same page to match desired relative area proportions. This feature allows the system to control the relative sizes of graphic elements in an album page as additional graphic elements are added to the album page, without having to revise the specification for the actual areas of the graphic elements. For example, rather than specifying that the area of graphic element A should be two square inches and that the area of graphic element B should be four square inches, the constraint generator module 66 specifies that graphic element A must have half the area of graphic element B.

In some implementations, a relative area proportion value is specified for each variable area image. In the following description, the relative area proportion for image "j" is denoted RAP(j) and a first image (image 1) is designated the "reference" image. If there is only one variable-area image on an album page, there are no relative area constraints. If there are N variable-area images on an album page, where N>1, then the constraint generator module 66 generates (N−1) relative area constraints, as follows:

$$T(j) - B(j) = \sqrt{\frac{RAP(j) \times \text{aspect}(j)}{RAP(1) \times \text{aspect}(1)}} \times (T(1) - B(1))$$

for $1 < j \leq N - 1$

Here, T(j) and B(j) are the top and bottom of variable-area image j. Note that although these are constraints on the heights of the images, they are equivalent to constraints on image areas.

G. Maximizing Areas of Variable-Area Images

In some implementations, the constraint generator module 66 generates for one variable area image a STRONG constraint that the height of the image should equal the height of the page. This constraint encourages (without explicitly requiring) that variable-area images be as large as possible. Because the areas of the variable-area images are coupled by the relative area constraints described above, it is only necessary to add this constraint for a single image.

H. Requiring Each Graphic Element to be within an Album Page

In some implementations, the constraint generator module 66 specifies constraints that force the graphic elements in a candidate relative layout to be on a single album page. In some of these implementations, the constraint generator module 66 imposes this condition by adding the following REQUIRED constraints for each graphic element X:

T(X)>top_page_border strength=REQUIRED

B(X)<bottom_page_border strength=REQUIRED

L(X)>left_page_border strength=REQUIRED

R(X)<right_page_border strength=REQUIRED

In these implementations, the origin of the coordinate system for each album page is at the top, left corner of the page, and the directions to the right and down are positive directions for their respective axes (see, e.g., the coordinate system shown in FIG. 8D).

In some implementations, the constraint generator module 66 avoids generating redundant constraints as follows. For each horizontal path, the constraint generator module 66 only constrains the left side of the first graphic element in the path to be greater than the left page border and the right side of the last graphic element in the path to be less than the right page border. Similarly, for each vertical path, the constraint generator module 66 only constrains the top side of the first graphic element in the path to be greater than the top page border and the bottom side of the last graphic element in the path to be less than the bottom page border.

I. Extensions

The embodiments that are described above provide a base technology for generating a wide spectrum of documents, from pure text documents to pure photo pages to mixed content pages. Different vertical applications, such as photo books, catalogs, and news letters can be built, often by adding extra constraints. One extension is to add extra aesthetic constraints (e.g., alignments among graphic elements inside a graphic assembly) when running the constraint solving algorithm that is described below in connection with FIG. 12. More style constraints regarding the relative positions of graphic elements in a graphic assembly can be added to the iteration process. For example, in a photo page layout a constraint may be added to prohibit a caption siding with a photo.

V. Determining Determinate Layouts of Graphic Elements

As explained above, the constraint solver module 68 determines from each set of constraints that is received from the constraint generator module 66 a respective determinate layout of the graphic elements on a respective album page. In this process, the constraint solver module 68 determines the positions P(i) and attributes X(i) of each graphic element i in each determinate layout. Among the attributes in the attribute vector X(i) are the height h and width w of the graphic element i.

A. General Framework

Figure 12:
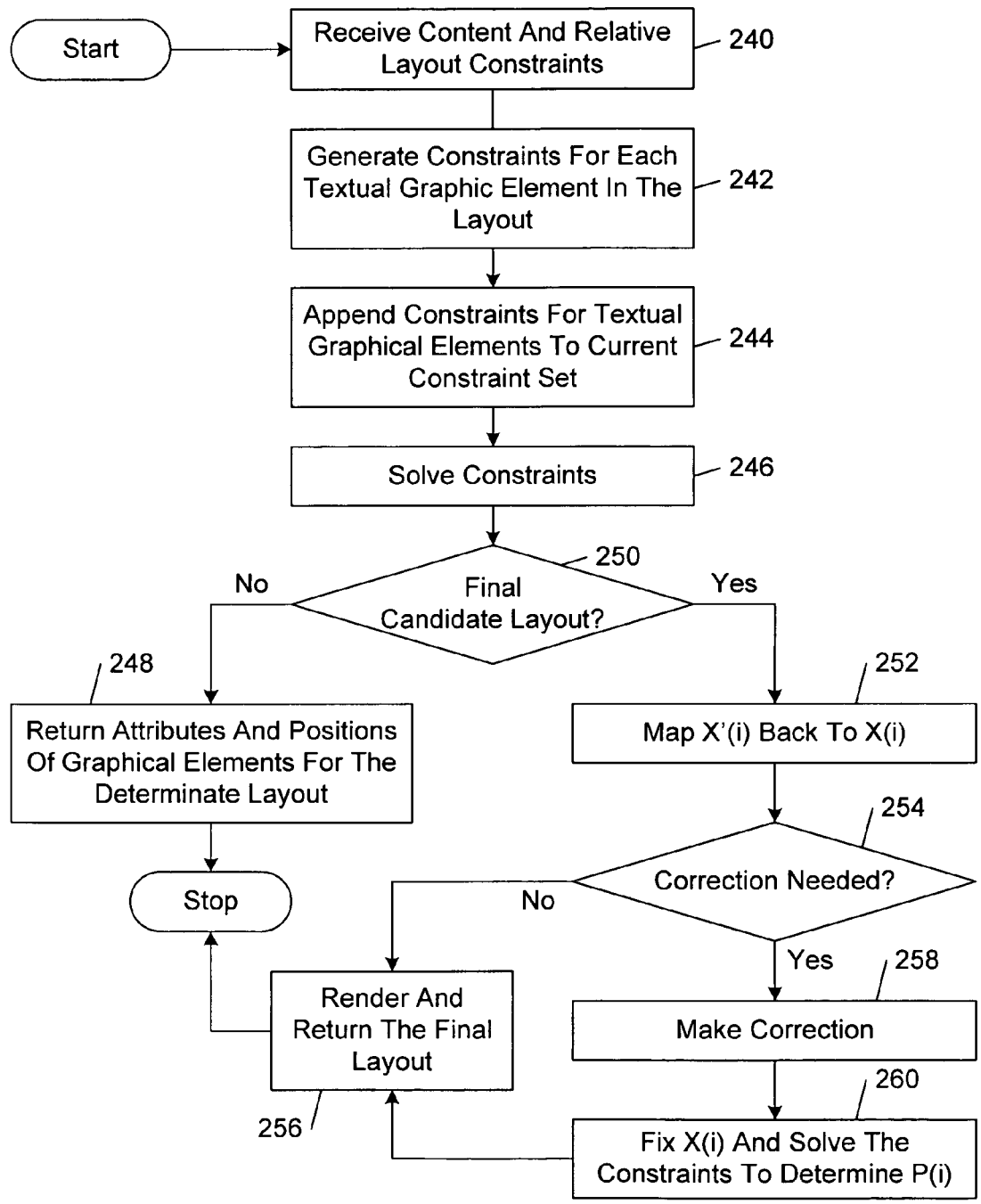
FIG. 12 is a flow diagram of an embodiment of a method of determining a determinate layout of graphic elements on a page from a set of constraints describing a relative layout of the graphic elements on the page.

FIG. 12 shows an embodiment of a method of determining a determinate layout of graphic elements on a page from a set of constraints describing a relative layout of the graphic elements on the page.

In accordance with this method, the constraint solver module 68 receives content and relative layout constraints to be used in generating a determinate layout (block 240). The content may include content in the form of the graphic elements to be included in the determinate layout. The constraints may be in the form of a template and may include limitations to be applied with respect to one or both of the positions and attributes of the graphic elements. The constraints may include, for example, alignment constraints, aspect ratio constraints, dimension range constraints, separation constraints, and order constraints. In addition to receiving the constraints from the constraint generator module 66, the constraint solver module 66 also receives attributes for each textual graphic element, including the text string, the font, the point size, and the line spacing.

After receiving the content and layout constraints (block 240), the constraint solver module 68 generates constraints for each textual graphic element in the layout (block 242). As explained in detail below, this process involves modeling the height and width of each textual graphic element with one or more linear constraints. These constraints allow the constraint solver module 68 to determine an optimal width-height balance for the textual graphic elements during the process of determining an optimal determinate layout for a given relative layout.

The constraint solver module 68 appends the constraints generated for each of the textual graphic elements to the current set of constraints received from the constraint generator module 66 (block 244).

The constraint solver module 68 then solves the constraints (block 246). In general, the constraint solver module 68 may solve the constraints using any one of a wide variety of different constraint solving or linear programming methods, including a simplex-based linear constraint solving method. The results of the constraint solving process include estimates of attribute values X'(i) and positions P(i) for each of the graphic elements i on an album page.

In the illustrated embodiment, the constraint solver module 68 returns the estimated attributes X'(i) and positions P(i) for the determinate layout (block 248), if the determinate layout corresponds to a candidate relative layout submitted by the layout generator module 64 (block 250). If the determinate layout corresponds to a final layout selected by the layout generator module 64 (block 250), the constraint solver module 68 runs through a second constraint solving pass to improve the results and renders the final layout in a predetermined format (e.g., in PDF). By only performing the second constraint-solving pass for final layouts, the constraint solver module 68 significantly reduces the computational resources that otherwise would be required if both the first and second constraint-solving passes were performed for all layouts.

During the second constraint-solving pass, the constraint solver module 68 maps the estimated attributes X'(i) back to the actual attributes X(i) to determine whether there are errors in the estimated dimensions X'(i) (block 252). In some implementations, the actual attributes X(i) correspond to the rendered dimensions of the graphic elements that are received at block 240.

Based on a comparison of the estimated attribute values and the actual attribute values, the constraint solver module 68 determines whether a correction is needed (block 254). For example, the constraint solver module 68 may determine whether the estimated height of a textual graphic element correlates with the estimated width of the textual graphic element. The height of the graphic element may be determined using a line-breaking algorithm.

If no correction is needed, the constraint solver module 68 renders the final determinate layout and returns the final determinate layout (block 256).

If a correction is needed, the constraint solver module 68 makes a correction (block 258). In this process, the constraint solver module 68 may fix the height of a textual graphic element to the actual height of the textual graphic element. After the correction has been made (block 258), the attributes X(i) of the graphic elements are fixed and the constraint solver module 68 solves the constraints again to determine the corresponding corrected positions P(i) of the graphic elements (block 260). In this process, the constraints that are used in the second pass may include specifications of the widths for the textual graphic elements determined in the first pass in block 246 and specifications of the corresponding heights for the textual graphic elements determined at block 258.

B. Generating Constraints for Textual Graphic Elements

Figure 13:
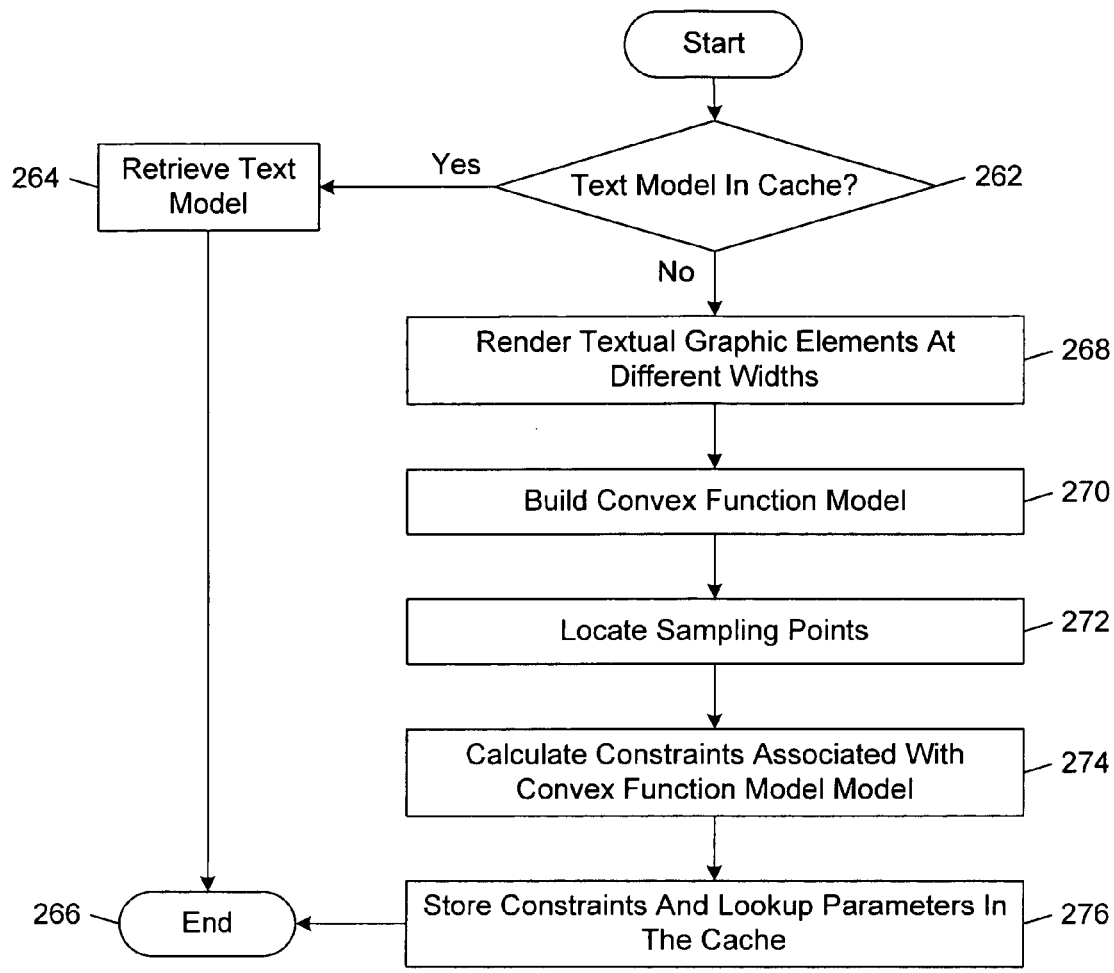
FIG. 13 is a flow diagram of an embodiment of a method of generating constraints for a textual graphic element in a layout.

FIG. 13 shows an embodiment of a method of generating constraints for a textual graphic element in a layout.

In accordance with this method, the constraint solver module 68 initially determines whether a text model for the current textual graphic element already has been computed and stored in a cache (block 262). Among the types of attributes that are used to determine a match are the text content of the graphic elements, the font style, and the font size. If the corresponding text model is stored in the cache, the constraint solver module 68 retrieves the text model (block 264) and the process ends (block 266).

If the corresponding text mode is not stored in the cache (block 262), the constraint solver module 68 renders textual graphic elements whose heights and widths are allowed to change at several different widths $(w_1, w_2, \ldots w_n)$ to determine their corresponding heights $(h_1, h_2, \ldots h_n)$ (block 268). In general, the relationship between the widths and heights of graphic elements containing text is typically non-linear. In this regard, a linear constraint typically is unavailable to determine the width-height relationships. Instead, the width-height relationships may be determined through a method that replaces the actual text content in the graphic elements into various text containers having different widths, as explained in U.S. patent application Ser. No. 11/107,175, filed Apr. 15, 2005, by Xiaofan Lin et al. and entitled "Automatic Layout Generation for Documents Containing Text"

The constraint solver module 68 then builds a convex function model for the determined width-height relationship (block 270). The convex function model may be built based upon the data points $(w_1, h_1), (w_2, h_2) \ldots (w_n, h_n)$ that were determined in block 268. The convex function model may be built out of a number of rendering results with different (w, h) combinations. In particular, the convex function model may correspond to a convex function curve that is built from line segments corresponding to data points $(w_1, h_1), (w_2, h_2) \ldots (w_n, h_n)$. These line segments may be formed through a connection between adjacent data points. The data points $(w_1, h_1), (w_2, h_2) \ldots (w_n, h_n)$ then may be fitted into a convex function curve, such as the following hyperbolic function:

$$h(w)=k/w+b$$

where k and b are constant for a given text content and format. Values for the constants k and b may be calculated using any one of a wide variety of different curve fitting methods, including regression methods.

After the complex function model has been built, the constraint solver module 68 locates sampling points across the maximal range of widths (w) (block 272). By way of example, the sampling range of widths for an object 102a may be between fifty and five hundred points and twenty sampling points may be located. The selection of the number of sampling points may be based on a trade-off between precision and speed. For instance, a relatively large number of sampling points may be selected to increase the accuracy, while decreasing the speed at which a determinate layout may be generated. In addition, the sampling points may be selected such that the intervals between the heights of the sampling points are constant, thereby ensuring that a generally representative range of data points is considered in the layout generation.

Next, the constraint solver module 68 calculates linear constraints that are associated with the convex function models that were built in block 270. These models define constraints on the height-width relationships of the textual graphic elements. The linear constraints may be calculated for each of the graphic elements containing text whose dimensions X(i) are allowed to change. The linear constraints for each of the graphic elements containing text may be determined based upon the sampling points (i) located from the convex function model built in block 270, as follows:

$$F(w,i)=h[i]+(h[i]-h[i-1])*(w-w[i-1])/(w[i]-w[i-1])$$

where $h \geq F(w,i)$ for all $i=1, \ldots, n$. This equation may be used to calculate clusters of linear constraints based upon the convex function model. In this regard, the cluster of linear constraints describes the convex relationship between the height and the width of the textual graphic elements and therefore may be used to determine the heights that correspond to various widths of the textual graphic elements with a relatively high degree of precision.

After the constraints have been calculated (block 274), the constraint solver module 68 stores the constraints and various lookup parameters in the cache (block 276). Among the types of lookup parameters that are stored are the text content, the font style, and the font size.

Additional details regarding the various steps of the methods shown in FIGS. 12 and 13 are described in U.S. patent application Ser. No. 11/107,175, filed Apr. 15, 2005, by Xiaofan Lin et al. and entitled "Automatic Layout Generation for Documents Containing Text".

VI. Selecting a Final Layout of Graphic Elements

As explained above, the layout generator module 64 selects one of the determinate layouts 84 as a final layout of the graphic elements on the current album page.

In some implementations, the layout generator module 64 selects the final determinate layout using a process that seeks to maximize page coverage while avoiding overlap of graphic elements. In an exemplary approach, the layout generator module 64 computes for each of the determinate layouts 84 a layout score that corresponds to coverage, which is defined as the fraction of the page occupied by variable-area image graphic elements. In other embodiments, the page layout module 14 may select the final determinate layout based on a different layout score, such as layout scores based on user preferences and visual factors.

The layout generator module 64 then passes the selected final layout of the graphic elements on the page to the constraint solver module 68, which runs through the first and second constraint solving passes and renders the final layout, as described above. The rendered layout is passed to the user interface module 70 for presentation to the user.

VII. Conclusion

To summarize, the embodiments described above provide ways to arrange graphic elements on the pages of an album based on constraints describing layout relationships among graphic elements on an album page. These embodiments enable layouts of different types of graphic elements on an album page to be created without using predefined templates, enabling the creation of new types of documents (e.g., photo/video albums with captions).

Other embodiments are within the scope of the claims.

For example, in some implementations, the constraint solver module 68 may be implemented in a server mode that receives from one or both the layout generator module 64 and the constraint generator module 66 messages requesting the calculation of a determinate layout in accordance with a set of relative layout constraints. In this way, the overhead associated with loading the constraint solver module 68 may be reduced significantly.

Figure 14:
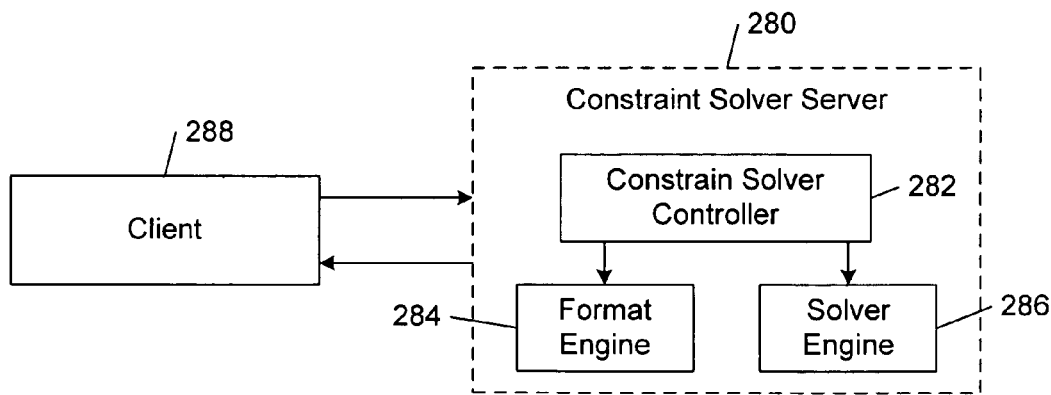
FIG. 14 is a block diagram of a server mode implementation of the constraint generator module in the albuming system shown in FIG. 4.

FIG. 14 shows a server implementation 280 of the constraint solver engine 68 that includes a constraint solver controller 282, a format engine 284, and a constraint solver engine 286. The format engine may be, for example, an XSL-FO (extensible Stylesheet Language Formatting Options) processor that is configured to convert determinate layouts into the PDF format. The constraint solver engine 286 may be a simplex-based linear constraint solving processor.

The constraint solver server 280 receives messages from a client 288, which may be the constraint generator module 66 or the layout generator module 64. The constraint solver server 80 sits in a separate address space from the address space of the other components of the albuming system 60. In some implementations, the constraint solver server 280 resides in a standalone Java Virtual Machine and the other modules 64, 66, and 70 of the albuming system 60 reside in a native Windows memory space.

In some implementations, the client 288 stores in a predetermined file location the various data (e.g., the contents, layout constraints, and attributes for a set of graphic elements) that are needed by the constraint solver server 280 to compute a determinate layout. The client 288 then sends to the constraint solver server 280 a message requesting the computation of a determinate layout based on the data stored in the predetermined file location. In one exemplary implementation, the client 288 is a lightweight shell program that sends requests to the layout adjustment engine through TCP sockets.

The constraint solver server 280 is preloaded only once before being invoked and then its stays in its designated memory space. The constraint solver server 280 then listens to a particular TCP socket for incoming requests, retrieves the data stored in the predetermined file location, executes the constraint solving method described above, and stores the results in a second predetermined file location. The constraint solver server 280 then sends a message to the client 288 indicating that the results have been stored in the second predetermined file location.

The client/server mode of operation significantly increases the speed at which the albuming system determines layouts for a given set of graphic assemblies. In addition, because TCP/IP is a standard protocol supported by different programming languages, this approach also makes the layout adjustment engine accessible to client programs in various languages, such as C, Java, and C#.

What is claimed is:

1. A machine-implemented method of albuming graphic elements, comprising:

identifying candidate relative layouts of graphic elements on a page, wherein each of the candidate relative layouts describes a respective set of layout relationships among the graphic elements;

generating for each of the candidate relative layouts a respective set of constraints describing the corresponding set of layout relationships among the graphic elements;

determining a respective determinate layout of the graphic elements on the page from each set of constraints; and selecting one of the determinate layouts as a final layout of the graphic elements on the page.

2. The method of claim 1, wherein the identifying comprises locating the graphic elements in respective tree structures corresponding to the candidate relative layouts, each of the tree structures having one or more leaf nodes corresponding to respective ones of the graphic elements and one or more interior nodes corresponding to respective divisions of the page.

3. The method of claim 2, wherein the locating comprises locating in a respective one of the tree structures a graphic assembly comprising at least two constituent graphic elements.

4. The method of claim 3, wherein the locating of the graphic assembly comprises identifying a respective tree structure for each of multiple presentations of the graphic assembly corresponding to different respective arrangements of the constituent graphic elements.

5. The method of claim 3, wherein the identifying comprises sequentially adding graphic assemblies to each of the tree structures.

6. The method of claim 5, wherein the adding comprises evaluating all possible presentations of each added graphic assembly in each of a respective set of available node locations in the corresponding tree structures.

7. The method of claim 1, further comprising generating a set of paths through each of the candidate relative layouts.

8. The method of claim 7, wherein each of the paths corresponds to a list of ones of the graphic elements in respective partitions of one of the candidate relative layouts separated by divisions crossed by the path.

9. The method of claim 1, wherein the generating comprises generating relative position constraints preserving relative positions of the graphic elements in each of the candidate relative layouts.

10. The method of claim 9, further comprising determining a set of paths through each of the candidate relative layouts, and generating the relative position constraints from the sets of paths.

11. The method of claim 10, wherein the generating of the relative position constraints comprises generating a constraint for each traversal of the paths through a division of the corresponding candidate relative layouts.

12. The method of claim 9, wherein the generating of the relative position constraints comprises incorporating specified minimum distances between adjacent graphic elements in the relative position constraints.

13. The method of claim 1, wherein the generating comprises generating constraints promoting aspect ratios with widths greater than heights for textual graphic elements respectively associated with at least one other of the graphic elements.

14. The method of claim 1, wherein the generating comprises generating constraints specifying minimal dimensions for at least one of the graphic elements.

15. The method of claim 1, wherein the generating comprises generating constraints specifying dimensions of ones of the graphic elements designated as having fixed areas.

16. The method of claim 1, wherein the generating comprises generating constraints specifying aspect ratios of ones of the graphic elements designated as having variable areas.

17. The method of claim 1, wherein the generating comprises generating rules constraining relative areas of ones of the graphic elements designated as having variable areas.

18. The method of claim 1, wherein the generating comprises generating at least one constraint promoting maximization of areas of ones of the graphic elements designated as having variable areas.

19. The method of claim 1, wherein the generating comprises generating each set of constraints free of redundant constraints.

20. The method of claim 1, wherein the generating comprises generating constraints specifying alignment relationships among graphic elements designated as being related.

21. The method of claim 1, wherein the generating comprises generating textual constraints for ones of the graphic elements comprising text.

22. The method of claim 21, wherein the generating of the textual constraints comprises modeling height and width dimensions of the graphic elements comprising text.

23. The method of claim 1, wherein the determining comprises solving each set of constraints to obtain estimates of attributes and positions of the graphic elements in the determinate layouts.

24. The method of claim 23, wherein the determining additionally comprises:
 correcting a set of attributes estimated for a given one of the graphic elements in a given candidate layout;
 modifying the set of constraints corresponding to the given candidate layout; and
 solving the modified set of constraints to obtain revised estimates of attributes and positions of the graphic elements in the determinate layout corresponding to the given candidate layout.

25. The method of claim 24, wherein the correcting, modifying, and solving of the modified set of constraints are performed only with respect to layouts designated as final layouts.

26. The method of claim 1, further comprising initiating the determining of the determinate layouts by transmitting a message from a client to a server.

27. A machine for albuming graphic elements, comprising one or more machine-readable media and digital electronic circuitry configured to perform computer process operations comprising:
 identifying candidate relative layouts of graphic elements on a page, wherein each of the candidate relative layouts describes a respective set of layout relationships among the graphic elements;
 generating for each of the candidate relative layouts a respective set of constraints describing the corresponding set of layout relationships among the graphic elements;
 determining a respective determinate layout of the graphic elements on the page from each set of constraints; and
 selecting one of the determinate layouts as a final layout of the graphic elements on the page.

28. A machine-readable medium storing machine-readable instructions causing a machine to perform operations comprising:
 identifying candidate relative layouts of graphic elements on a page, wherein each of the candidate relative layouts describes a respective set of layout relationships among the graphic elements;
 generating for each of the candidate relative layouts a respective set of constraints describing the corresponding set of layout relationships among the graphic elements;
 determining a respective determinate layout of the graphic elements on the page from each set of constraints; and
 selecting one of the determinate layouts as a final layout of the graphic elements on the page.

29. A computer system for albuming graphic elements, comprising:
 computer hardware programmed to perform computer process operations comprising
 identifying candidate relative layouts of graphic elements on a page,
 wherein each of the candidate relative layouts describes a respective set of layout relationships among the graphic elements,
 generating for each of the candidate relative layouts a respective set of constraints describing the corresponding set of layout relationships among the graphic elements,
 determining a respective determinate layout of the graphic elements on the page from each set of constraints, and
 selecting one of the determinate layouts as a final layout of the graphic elements on the page.

* * * * *